United States Patent
Sassoon

(10) Patent No.: US 11,815,232 B2
(45) Date of Patent: *Nov. 14, 2023

(54) COMBINATION LED LAMPS

(71) Applicant: Charles I. Sassoon, Hauppauge, NY (US)

(72) Inventor: Charles I. Sassoon, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,686

(22) Filed: Aug. 26, 2022

(65) Prior Publication Data

US 2022/0412531 A1    Dec. 29, 2022

Related U.S. Application Data

(63) Continuation of application No. 17/334,100, filed on May 28, 2021, now Pat. No. 11,428,380.

(60) Provisional application No. 63/031,421, filed on May 28, 2020.

(51) Int. Cl.
| | | |
|---|---|---|
| *F21S 43/14* | (2018.01) | |
| *F21W 103/20* | (2018.01) | |
| *F21W 103/45* | (2018.01) | |
| *F21W 103/35* | (2018.01) | |
| *F21Y 115/10* | (2016.01) | |

(52) U.S. Cl.
CPC ........ *F21S 43/14* (2018.01); *F21W 2103/20* (2018.01); *F21W 2103/35* (2018.01); *F21W 2103/45* (2018.01); *F21Y 2115/10* (2016.08)

(58) Field of Classification Search
CPC ........ F21S 43/14; F21W 2103/10–45; F21Y 2115/10
See application file for complete search history.

(56) References Cited

U.S. PATENT DOCUMENTS

| | | | |
|---|---|---|---|
| 6,520,669 B1 * | 2/2003 | Chen | F21S 43/14 313/511 |
| 7,055,996 B2 * | 6/2006 | Pond | B60Q 1/32 362/544 |
| 7,683,772 B2 | 3/2010 | Smith | |
| 8,052,313 B2 * | 11/2011 | Sassoon | B60Q 1/0052 362/540 |
| 9,539,932 B2 * | 1/2017 | Fay | B60Q 1/2696 |
| 2005/0047167 A1 | 3/2005 | Pederson et al. | |
| 2008/0080199 A1 | 4/2008 | Sassoon | |
| 2010/0309677 A1 | 12/2010 | Kazaoka | |
| 2012/0188780 A1 | 7/2012 | Wilk | |
| 2013/0094209 A1 | 4/2013 | Yu | |
| 2013/0201714 A1 | 8/2013 | Huang-Tsai | |
| 2015/0204521 A1 | 7/2015 | Zhang et al. | |

FOREIGN PATENT DOCUMENTS

EP        1762432 A2 *  3/2007  ......... B60Q 1/2615

* cited by examiner

*Primary Examiner* — Jason M Han
(74) *Attorney, Agent, or Firm* — Brown Rudnick LLP; Ian G. DiBernardo

(57) ABSTRACT

Various embodiments of a combination lamp are provided, which combine a plurality of different lamp functions in a unitary configuration, and can reduce the total amount of space taken up for at least substantially the same amount of illumination produced. The combination lamps can be configured for use on vehicles, light fixtures, free standing lamps, decorative articles, etc. In some embodiments, each lamp component may have a power connection element independent from the other lamp components.

20 Claims, 29 Drawing Sheets

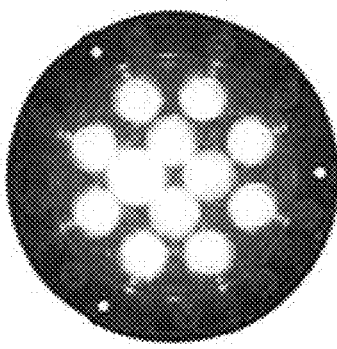
FIG. 28 — 12 LED RED STOP Light
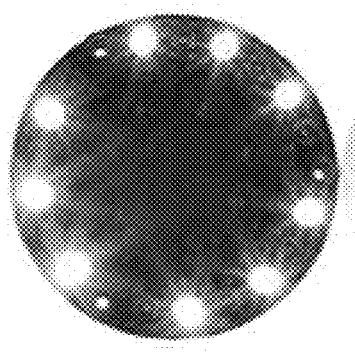
FIG. 30 — 9 LED Amber Warning & Turn
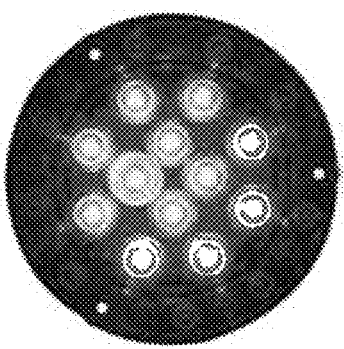
FIG. 27 — 12 LED RED Tail Light
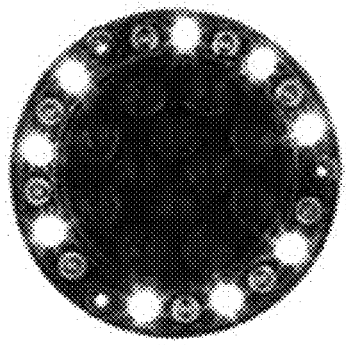
FIG. 29 — 9 LED WHITE Back-Up Light

FIG. 36

| Pattern # | Description | Function | Yellow | White |
|---|---|---|---|---|
| 0 | Random | Dual Color | | |
| 1 | Steady* | Single Color | | |
| 2 | Single-Quick | Dual Color | | |
| 3 | Single | Dual Color | | |
| 4 | Double | Dual Color | | |
| 5 | Steady-Double | Dual Color | | |
| 6 | Quad | Dual Color | | |
| 7 | Ultra | Dual Color | | |
| 8 | Mega* | Dual Color | | |
| 9 | Single-Quad | Dual Color | | |
| 10 | Single H/L | Dual Color | | |
| 11 | Single 2 (A/B) | Dual Color | SAE Class 3 | |
| 12 | Double 2 (A/B) | Dual Color | SAE Class 3 | |
| 13 | Quad 2 (A/B) | Dual Color | SAE Class 3 | |
| 14 | Quint | Dual Color | | |
| 15 | Mega-Separated[1] | Dual Color | | |
| 16 | Single Pulse[1] | Dual Color | | |
| 17 | Single-Quick | Single Color | | |
| 18 | Single | Single Color | SAE Class 1 | SAE Class 3 |
| 19 | Double | Single Color | SAE Class 1 | SAE Class 3 |
| 20 | Triple | Single Color | SAE Class 1 | SAE Class 3 |
| 21 | Quad | Single Color | SAE Class 1 | SAE Class 3 |
| 22 | Ultra | Single Color | SAE Class 2 | |
| 23 | Quint | Single Color | SAE Class 1 | SAE Class 3 |
| 24 | Mega* | Single Color | | |
| 25 | Single-Quad | Single Color | | |
| 26 | Single H/L | Single Color | | |
| 27 | Single Pulse* | Single Color | | |
| 28 | Double Pulse* | Single Color | | |

COMBINATION LED LAMPS

RELATED APPLICATIONS

This application is a continuation of U.S. application Ser. No. 17/334,100, filed May 28, 2021, now U.S. Pat. No. 11,428,380, which claims the benefit of U.S. Provisional Application No. 63/031,421, filed May 28, 2020, each of which is incorporated by reference herein in its entirety.

BACKGROUND

Multiple lamps are often used to illuminate a common area, either in combination or in an alternating fashion. For example, a room can have light fixture such as fluorescent lighting which illuminates the entire room when on, and provides no light when it is off. In addition, the room can have atmosphere lighting which provides a dim illumination. Similarly, the rear of a vehicle can have back-up lamps, which light up when the vehicle is being moved in reverse (or shifted into reverse/back-up), as well as stop/tail/turn lamps, which light up when the driver brakes, signals to turn, or turns on the headlights. These lamps are typically adjacent to each other, and most vehicles have two of each lamp, one on either side of the rear of the vehicle, above the rear bumper. In certain vehicles, such as trucks, it is common to have more than two of the back-up lamp and/or the stop/tail/turn lamp to provide brighter illumination.

SUMMARY

Various embodiments of a combination lamp are provided, which combine a plurality different lamp functions in a unitary configuration, and can simplify installation and reduce the total amount of space taken up for at least substantially the same amount of illumination produced. The combination lamps can be configured for use on vehicles, light fixtures, free standing lamps, decorative articles, etc. In some embodiments, each lamp component may have a power connection element independent from the other lamp components.

In some embodiments, a combination lamp is provided that includes a stop/turn/tail lamp surrounded by a flange for installation onto a vehicle, wherein the stop/tail/turn lamp and the flange each have a separate set of light sources, preferably comprising one or more light-emitting diodes (LEDs). At least a first portion of the LEDs of the flange are activated when the vehicle backs up, thus performing as a back-up lamp. In some embodiments, the stop/tail/turn lamp and the back-up lamp have separate power plugs connected to the vehicle in such a way that the stop/tail/turn lamp turns on when the driver signals, brakes, or when the headlights are on, and the back-up lamp turns on when the vehicle is backing-up, and not vice-versa.

In some embodiments, at least a second portion of the LEDs of the flange may have a dedicated warning lamp function. The warning lamp may be initiated and energized by a separate set of wires connected to a dedicated switch (on/off). When the warning lamp is in use and the user decides to put the vehicle in back-up, brake (stop), or turn mode, a built-in circuit can automatically cut off the warning function, so that the intense illumination of the warning lamp does not negate the visibility of the lamps used for the back-up, stop, and turn functions.

In some embodiments, in addition to or instead of the warning lamp, a work lamp function may be incorporated. For example, the LEDs of the flange used for the back-up function may be high output LEDs, and a higher output used for the work lamp function can be initiated and energized by a set of wires connected to a dedicated switch (on/off).

In some embodiments, the invention provides a combination LED lamp assembly comprising a first lamp in an inner portion of the assembly, having one or more first LEDs and a first power interface; and a flange at least partially surrounding the first lamp, the flange including a second lamp having one or more second LEDs and a second power interface, and a third lamp having one or more third LEDs and a third power interface coupled to a switch, wherein the one or more third LEDs are amber LEDs configured to provide an amber warning lamp function when the switch coupled to the third power interface is turned on.

In some embodiments, the first lamp is a stop/turn/tail lamp and the second lamp is a back-up lamp.

In some embodiments, the second lamp is further configured to provide a white warning lamp function when the switch coupled to the third power interface is turned on.

In some embodiments, the third lamp is further configured to provide an amber turn light.

In some embodiments, the assembly is configured to be mounted on a vehicle.

In some embodiments, the flange includes a plurality of holes and the assembly is configured to be mounted on the vehicle via the holes.

In some embodiments, the first, second, and third lamps are connected to a common power source.

In some embodiments, the assembly further comprises a connector wire coupled to the switch, the connector wire configured to select a flash pattern from a plurality of flash patterns when the switch is turned on.

In some embodiments, the plurality of flash patterns comprise dual color flash patterns and single color flash patterns.

In some embodiments, when a single color flash pattern is selected, the connector wire is further configured to toggle to an alternate color.

In some embodiments, the invention provides a combination LED lamp assembly comprising a first lamp in an inner portion of the assembly, having one or more first LEDs and a first power interface; and a flange at least partially surrounding the first lamp, the flange including a second lamp having one or more second LEDs and a second power interface coupled to a switch, wherein the first lamp is a stop/turn/tail lamp and the second lamp is a back-up lamp and a work lamp, wherein the one or more second LEDs are high output LEDs configured to provide the work lamp function when the switch coupled to the second power interface is turned on.

In some embodiments, the second lamp is configured to provide a light output of about 310 lm when operated as a back-up lamp and about 1,000 lm when operated as a work lamp.

In some embodiments, the assembly is configured to be mounted on a vehicle.

In some embodiments, the flange includes a plurality of holes and the assembly is configured to be mounted on the vehicle via the holes.

In some embodiments, the first and second lamps are connected to a common power source.

Additional features and advantages of embodiments of the present invention are described further below. This summary section is meant merely to illustrate certain features of embodiments of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings:

FIGS. 27-30 show the combination lamp of FIG. 21 in different operational modes;

FIG. 36 shows examples of different flash patterns for the warning lamp component of the combination lamp of FIG. 21;

DETAILED DESCRIPTION

Figure 1:
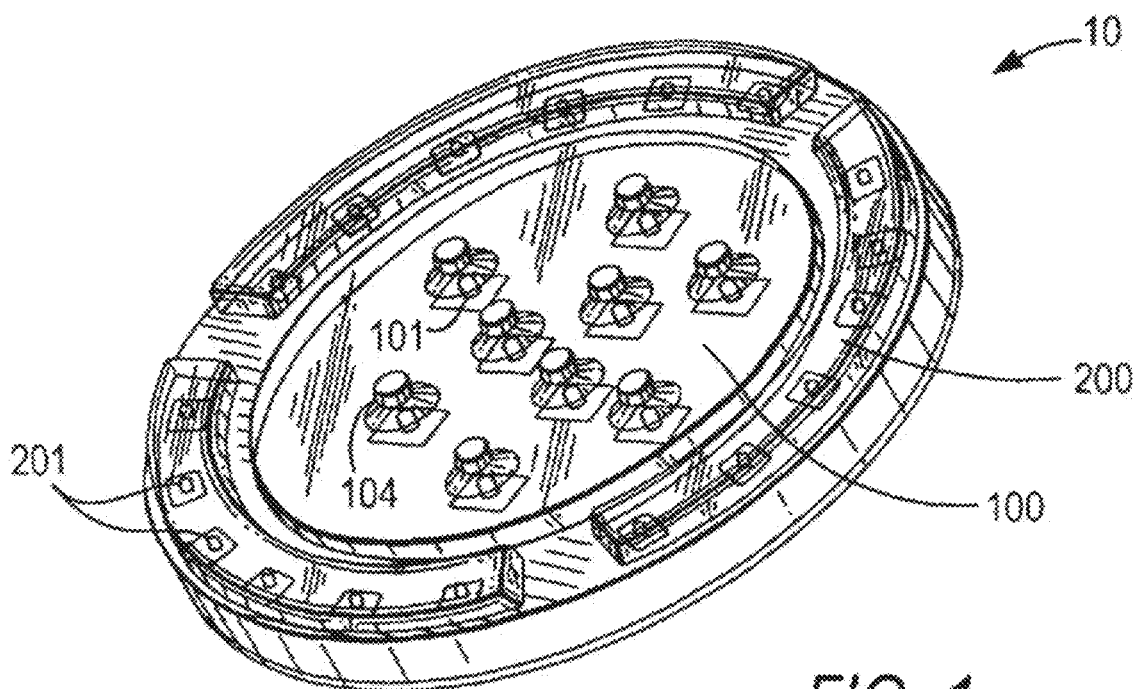
FIG. 1 is a front perspective view of an illustrative round combination lamp, according to various embodiments of the present invention.

Certain illustrative embodiments of the present invention will now be described with reference to the drawings. In general, such embodiments relate to a combination lamp comprising at least two different sets of light sources, wherein each set of light sources can be activated independently from the other sets of light sources.

Referring to FIGS. 1-8, certain embodiments of a combination lamp 10, 30 can comprise a first lamp 100, 300 and a second lamp 200, 400 in a fixed relationship with each other. See, e.g., U.S. Pat. No. 8,052,313, which is incorporated by reference herein in its entirety. Whereas combination lamp 10 shown in FIGS. 1-4 comprises a generally round shape and combination lamp 30 shown in FIGS. 5-8 comprises a generally oval shape, it is to be understood that a combination lamp constructed in accordance with the invention can take on any shape as a matter specific to an application or a matter of design choice.

As shown, first lamp 100, 300 can have a plurality of LEDs 101, 301 mounted on a first support 102, 302, preferably covered by a first lens 103, 303. Second lamp 200, 400 can comprise a plurality of LEDs 201, 401 mounted on a second support 202, 402, preferably covered by a second lens 203, 403. First lamp 100, 300 and second lamp 200, 400 can be constructed and arranged to be selectively removable from or permanently fixed to each other, as a matter specific to an application or a matter of design choice. Preferably, first support 102, 302 connects to second support 202, 402 to secure the first lamp 100, 300 and second lamp 200, 400 together. Additionally, second support 202, 402 preferably includes a mounting element 210, 410 for mounting second lamp 200, 400 and preferably combination lamp 10, 30 onto a surface, such as on a vehicle.

Referring to FIGS. 1-4, in accordance with certain uses of embodiments of the invention, such as outdoor use, especially on vehicles, it may be preferable for first support 102 to be permanently fixed to second support 202, to provide security. In accordance with various embodiments of the invention, second lamp 200 can be directly mounted on a surface, such as a vehicle body, and first lamp 100 can be connected to second lamp 200, which can maintain first lamp 100 in place. Certain illustrative embodiments include a second lamp 200 that comprises a flange for mounting on the rear of a vehicle. Second lamp 200 can thus be secured to the vehicle, and first lamp 100 can be connected to second lamp 200 by way of non-limiting example, by being inserted into a receiving aperture in second lamp 200. In accordance with certain illustrative embodiments of the invention, first lamp 100 can be inserted into the receiving aperture of second lamp 200 until it snaps into place, after which first lamp 100 cannot be removed.

Figure 2:
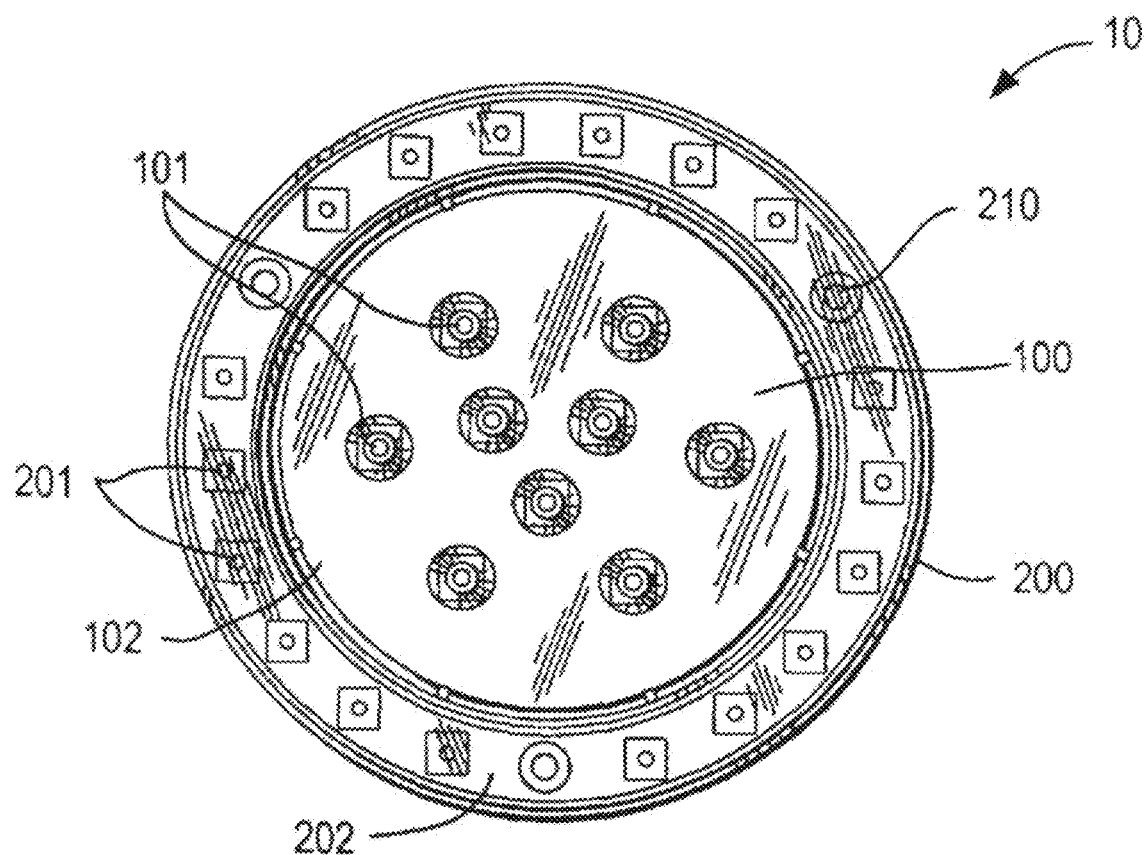
FIG. 2 is a top plan view of the combination lamp of FIG. 1.
Figure 4:
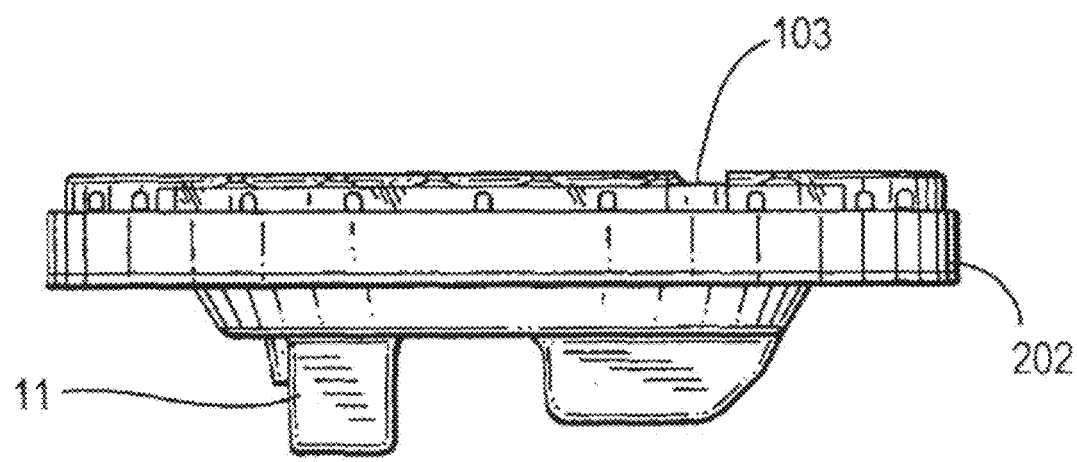
FIG. 4 is a side elevational view of the combination lamp of FIG. 1.
Figure 5:
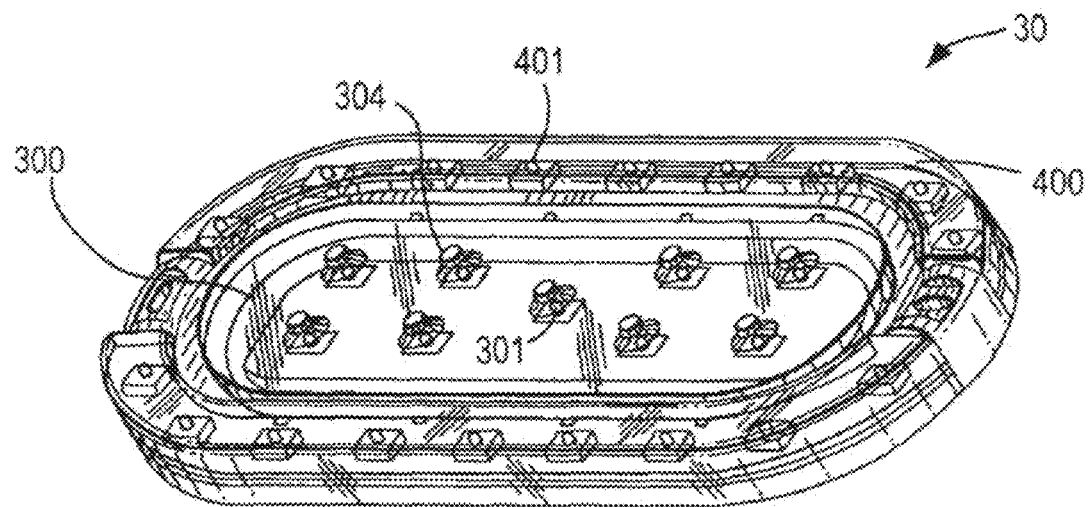
FIG. 5 is a front perspective view of an illustrative oval combination lamp, according to various embodiments of the present invention.

Alternatively, referring to FIG. 2 by way of non-limiting example, it may be desirable for first lamp 100 to be separable from second lamp 200. Such removability can facilitate quick and easy replacement of lamps 100 or parts thereof. For example, one can remove first lamp 100 from second lamp 200, replace the necessary LEDs, fix the circuitry, replace the lens, etc., whatever service is desired, then put first lamp 100 back in place. Alternatively, a replacement lamp can be put in place while first lamp 100 is serviced. Whereas first lamp 100 has been described as being inserted into and removed from second lamp 200, it is to be understood that second lamp 200 can be inserted into or removed from first lamp 100, without deviating from the scope of the invention.

The use of LEDs has been increasing recently, which may be partially because they can have an operating life of up to 100,000 hours before degradation commences. Therefore, an LED typically has greater operating life than a standard high-intensity incandescent bulb, which has a relatively short life span and is susceptible to damage. Furthermore, LEDs are commonly smaller in size than light bulbs, and provide more flexibility in positioning. Therefore, it can be preferable for combination lamp 10 to comprise LEDs in both lamps 100, 200. When used on a vehicle, the illumination provided by the LEDs preferably meets the appropriate DOT (Department of Transportation) standards. For example, if combination lamp 10 includes an amber LED lamp as first lamp 100 and is to be used on the front of a vehicle, the amber LED lamp preferably meets the full turn compliance standards. Preferably, second lamp 200 meets the DRL (Daytime Running Light) standards, which would permit it to be used as a DRL lamp, which the DOT has encouraged as enhancing safety by elevating the visibility and noticeability of moving vehicles. Second lamp 200 need not meet the DRL standards, however, if it is being used for other purposes, such as for a decorative use.

Figure 6:
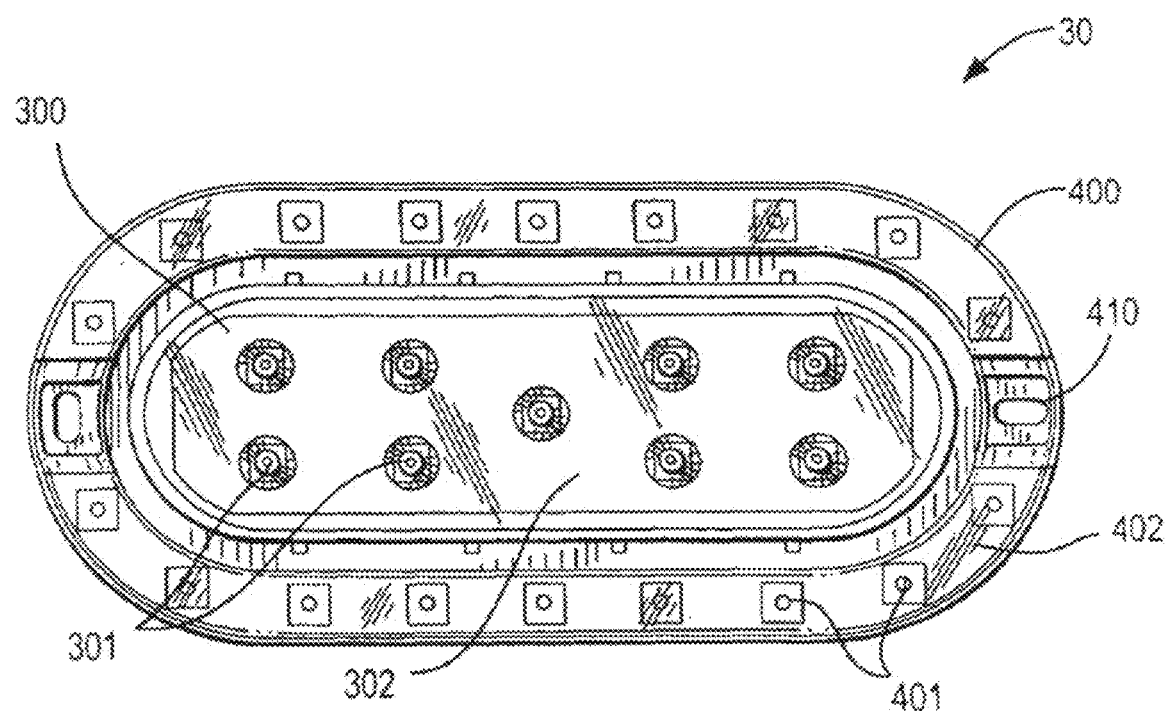
FIG. 6 is a top plan view of the combination lamp of FIG. 5.

Depending on the desired use of combination lamp 10, the number and positioning of LEDs per lamp 100, 200 can be varied. For example, whereas FIGS. 2 and 6 show certain embodiments of combination lamp 10, 30 wherein first lamp 100, 300 has nine LEDs and second lamp 200, 400 has eighteen LEDs, it is to be understood that the number of LEDs in each lamp can vary as a matter specific to an application or a matter of design choice.

Figure 3:
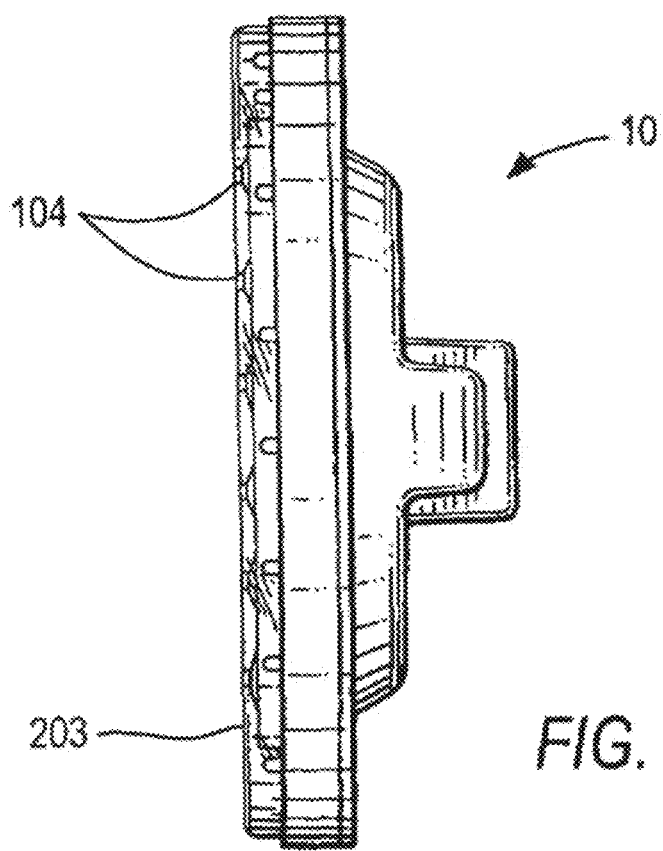
FIG. 3 is a side elevational view of the combination lamp of FIG. 1.
Figure 7:
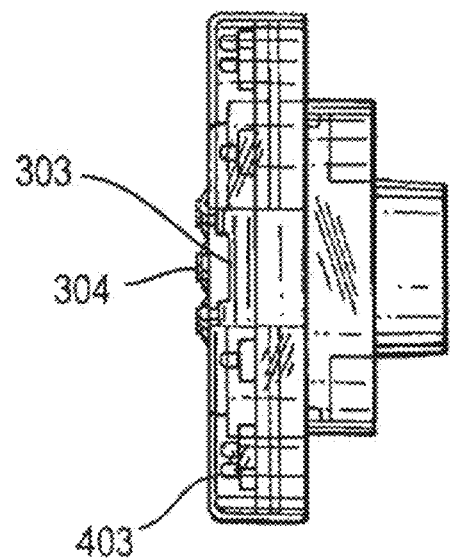
FIG. 7 is a side elevational view of the combination lamp of FIG. 5.

In accordance with the embodiments shown in FIGS. 3 and 7, first lamp 100, 300 comprises a plurality of projections 104, 304 on first lens 103, 303 located above LEDs 101, 301. These projections 104, 304 are preferably constructed and arranged to disperse light emitted from the LED below it, for example, by changing the direction of the emitted light. See, e.g., U.S. Pat. Nos. 8,009,364 and 8,717,679, which are incorporated by reference herein in their entirety. Whereas FIGS. 3 and 7 show second lamp 200, 400 without projections, it is to be understood that second lamp 200, 400 can also include projections, which can be similar or different from projections 104, 304 of first lamp 100, 300. Combination lamp 10, 30 can have any combination of lamps having projections, and first lamp 100, 300 and second lamp 200, 400 can have any number of projections without deviating from the scope of the invention.

Figure 8:
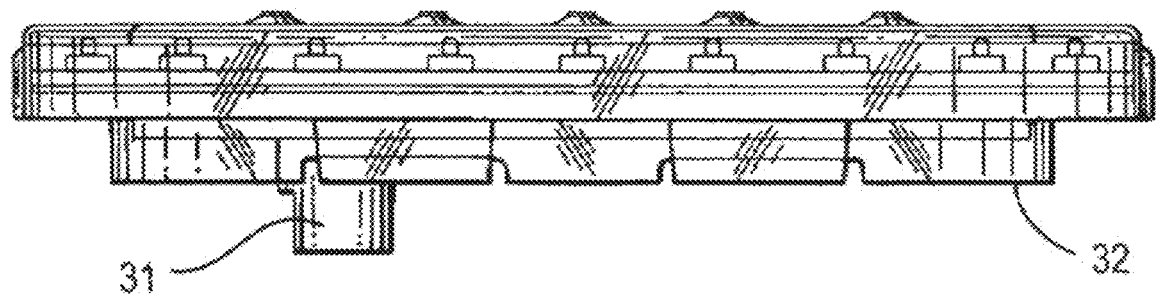
FIG. 8 is a side elevational view of the combination lamp of FIG. 5.

In accordance with various embodiments of the invention, as illustrated in FIG. 8, each lamp 300, 400 may have its own power connection 31, 32, such as a plug, outlet, or any mechanism for connecting to a power source. Power connections 31, 32 can either connect to the same or separate power sources. Accordingly, each lamp 300, 400 can be turned on or off or otherwise controlled independently of the another. For example, if combination lamp 30 as shown in FIGS. 5-8 is used on a vehicle, wherein first lamp 300 is a stop/tail/turn lamp and second lamp 400 is a back-up lamp, first lamp 300 will light up when the driver of the vehicle signals or stops, while second lamp 400 can remain off. On the other hand, when the driver backs up, first lamp 300 can remain off while second lamp 400 is lit. Alternatively, first lamp 300 can be a back-up lamp and second lamp 400 could be a stop/tail/turn lamp without deviating from the scope of the invention.

When used in a vehicle, it can be preferable for each first lamp 300 and second lamp 400 to be connected to the power source via separate cables. For example, the vehicles can have two cords for each lamp aperture or mount on which a combination lamp can be mounted. However, it is possible for one cord to be provided for each aperture/mount, wherein the power from each cord is split with a splitter or similar component, ends of the splitter being connected to one of the first connection of first lamp 300 or the second connection of second lamp 400. This is particularly suitable for vehicles that were built to house only one lamp in each aperture/mount.

Figure 9:
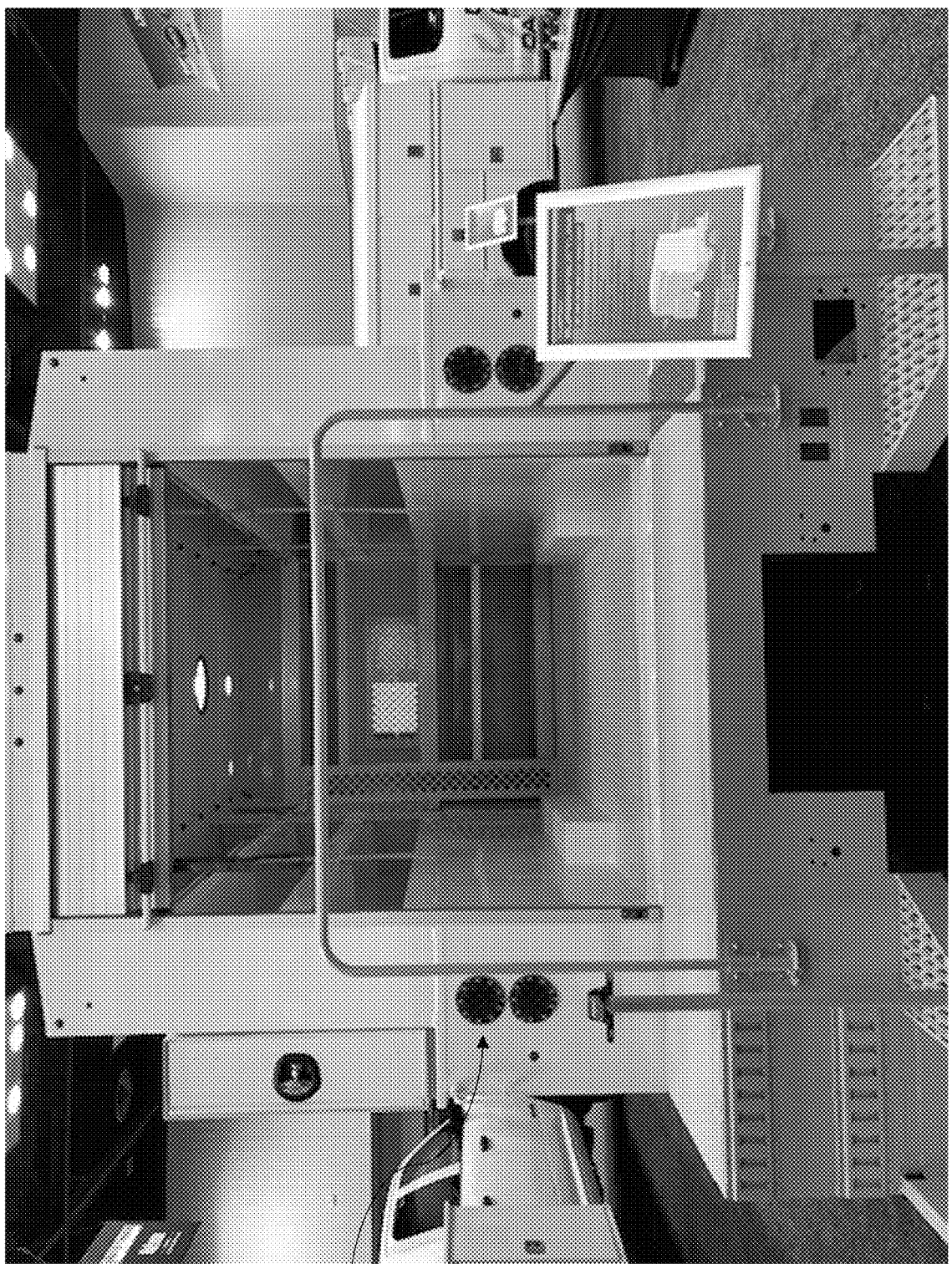
FIG. 9 is a front view of four illustrative round combination lamps according to various embodiments of the present invention installed on the rear of a vehicle.
Figure 10:
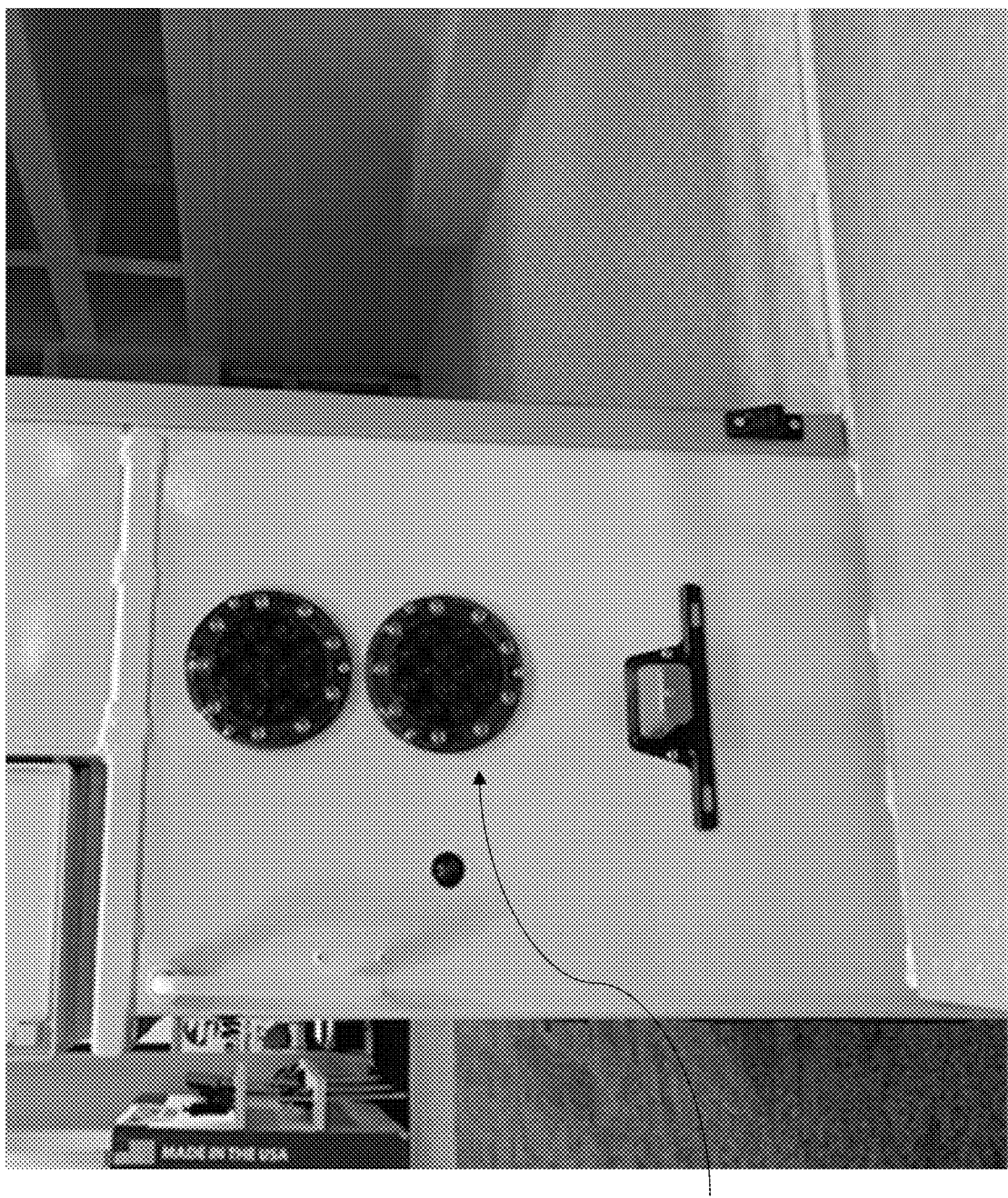
FIG. 10 is a close up view of the two combination lamps on the left side of FIG. 9.

One potential benefit in using a combination lamp in accordance with embodiments of the invention with vehicles (e.g., work trucks produced for use in industries such as, but not limited to, cable, plumbing, electrical, etc.) is that more light can be provided. For example, because the combination lamp 10, 30 occupies only one aperture/mount that one conventional stop/tail/turn or back-up lamp would occupy on the rear of the vehicle, one aperture/mount becomes free. One possible use of the freed aperture/mount is to mount an additional combination lamp, thus providing a total of four stop/tail/turn lamps and four back-up lamps (see, e.g., FIGS. 9 and 10) while occupying the same space as two of each of the conventional lamps. Therefore, the illumination provided for each action of braking, signaling to turn, backing-up, etc. can be doubled. Alternatively, a conventional stop/tail/turn lamp or back-up lamp (or other type lamp, such as a warning lamp or work lamp) may be mounted in combination with combination lamp 10, 30 thus providing extra illumination for specific actions.

Furthermore, combination lamp 10, 30 is preferably not significantly larger than a conventional stop/tail/turn or back-up lamp. For example, a conventional lamp for a vehicle, particularly trucks, is commonly mounted on a separate, dedicated mounting flange which is then mounted on the vehicle. Alternatively, a separate, dedicated mounting flange can be mounted first onto a vehicle, and a lamp can be subsequently mounted thereon. Another embodiment provides a lamp that is integrally formed with a dedicated mounting flange which is mounted on the vehicle. Thus, in accordance with the conventional lamps, both a lamp and a dedicated mounting flange structure are required. According to various embodiments of the present invention, the flange used for mounting can comprise one of the lamp components of a combination lamp. For example, referring to FIG. 2, second lamp 200 can comprise a flange which is mounted on the vehicle. Therefore, no substantive structure is being added in such an embodiment (the second lamp 200 occupying approximately the same space as the dedicated mounting flange used with a conventional lamp), and the space can be maximized.

In accordance with embodiments of the invention as shown in FIGS. 1-8, a combination lamp 10, 30 preferably includes at least two sets of light sources, one of which surrounds the other. As shown, second lamp 200, 400 surrounds the perimeter of first lamp 100, 300. Such an arrangement can be particularly beneficial for use as a vehicle stop/tail/turn-back-up combination lamp (see also FIGS. 13-16 described further below) or a DRL-amber combination lamp, thus maintaining the shape of the illumination consistent with standard stop/tail/turn, back-up, or amber lamps, and more particularly, when applicable, maintaining the flange-lamp arrangement consistent with conventional flanges and lamps.

First lamp 100, 300 and second lamp 200, 400 of a combination lamp 10, 30 in accordance with embodiments of the invention that are not mounted on a vehicle can also be connected to a common power source via a splitter or separate cords. Alternatively, first lamp 100, 300 and second lamp 200, 400 can be connected to different power sources entirely. Furthermore, second lamp 200, 400 need not surround first lamp 100, 300, but may be positioned side-by-side, intertwined, create a design with, etc., without deviating from the scope of the invention, as a matter specific to an application or a matter of design choice.

Another potential use of embodiments of the invention includes hallways, staircases, and the like, where it can be preferable to provide more than one type of illumination. For example, a dim light can remain on constantly, whereas a bright light can be turned on and off. In accordance with certain illustrative embodiments, second lamp 200, 400 can provide a low, dim light, such as a night light, and have a light sensor and only turns on when there is insufficient light present in the area. The first lamp 100, 300, in contrast, can provide brighter illumination, but is configured to be turned on and off by a user. By providing a combination lamp, the same area can be used for two different types and sources of light.

Combination LED lamps according to embodiments of the present invention can comprise various shapes and sizes, and further can be utilized at a variety of locations for a variety of functions without deviating from the scope of the invention, as a matter specific to an application or a matter of design choice. Additionally, other alterations can be made, such as, but not limited to, varying the number of LEDs, altering the transparency of the lenses, the shape and size of the supports, number, shape and/or size of the projections, etc. as a matter specific to an application or a matter of design choice, without deviating from the scope of the invention.

In various embodiments of the present invention, a combination lamp 10, 30 may be provided that has an appearance substantially as shown in FIGS. 1-8, but wherein the LEDs 201, 401 in the flange are higher output LEDs (e.g., higher power, higher luminosity compared to standard LEDs), and a more intense illumination thereof can provide a separate, third lamp function. When LEDs 201, 401 are embodied as higher output LEDs, for example, they can provide a work lamp function as well as a back-up lamp function. The higher output LEDs can be initiated and energized by a set of wires connected to a dedicated switch (on/off). When the switch is in an "off" position, LEDs 201, 401 may function as a back-up lamp providing typical back-up illumination as described above. When the switch is in an "on" position, the higher output may be engaged, and LEDs 201, 401 may function as work lamp providing brighter illumination in the back of the vehicle. In some embodiments, higher output LEDs 201, 401 may be mounted on an aluminum PCB, for example, to accommodate the increased amount of heat produced.

Figure 11:
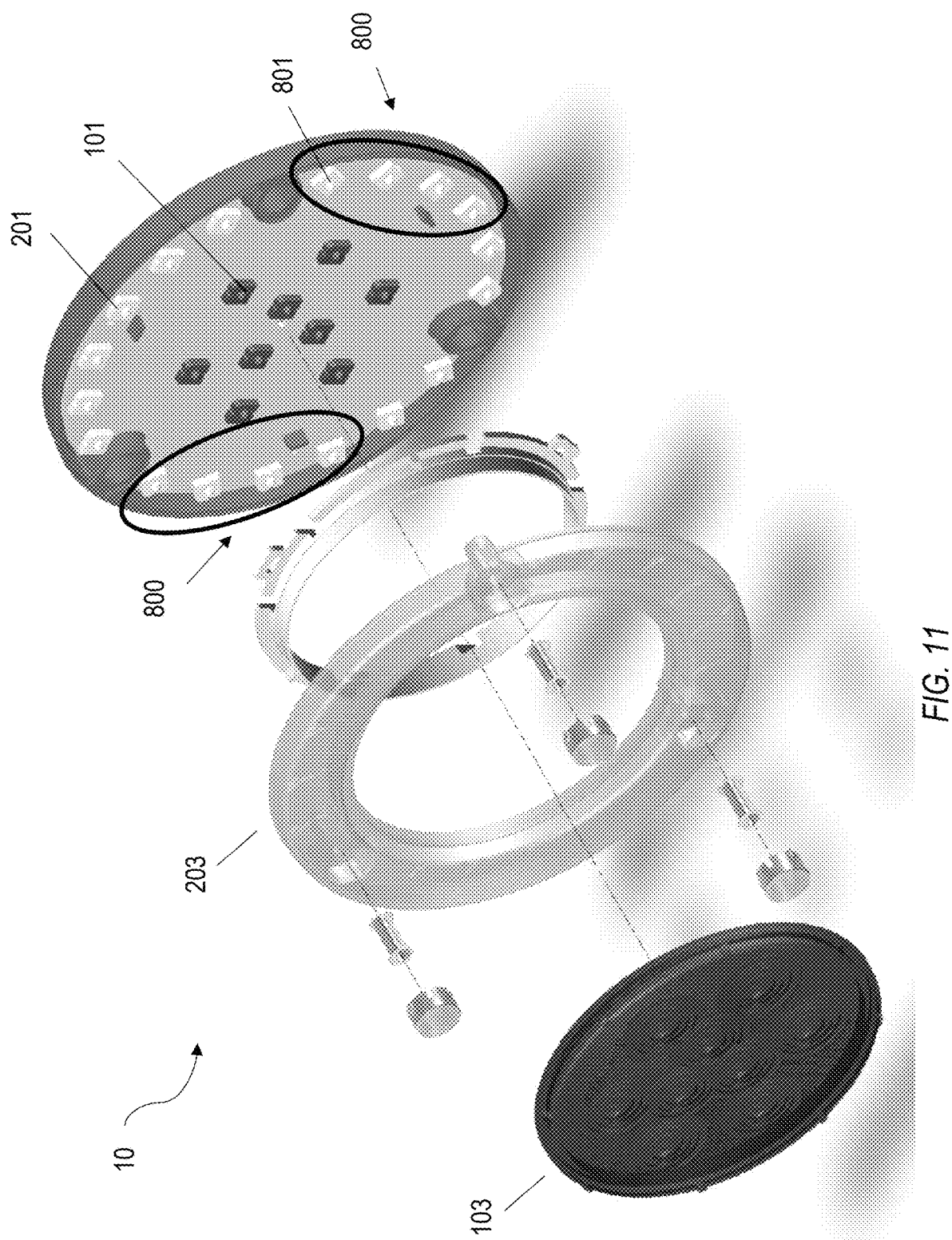
FIG. 11 is an exploded view of an illustrative round combination lamp incorporating a warning lamp in the flange, according to various embodiments of the present invention.
Figure 12:
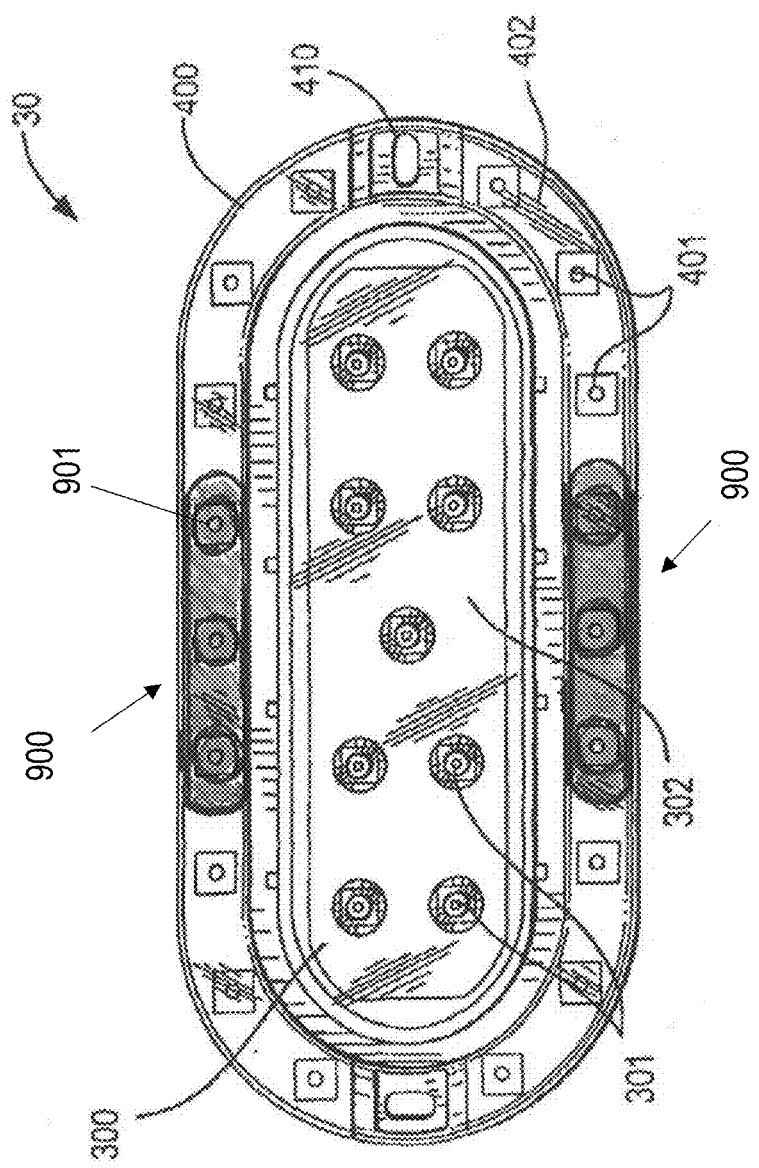
FIG. 12 is a top plan view of an illustrative oval combination lamp incorporating a warning lamp in the flange, according to various embodiments of the present invention.
Figure 13:
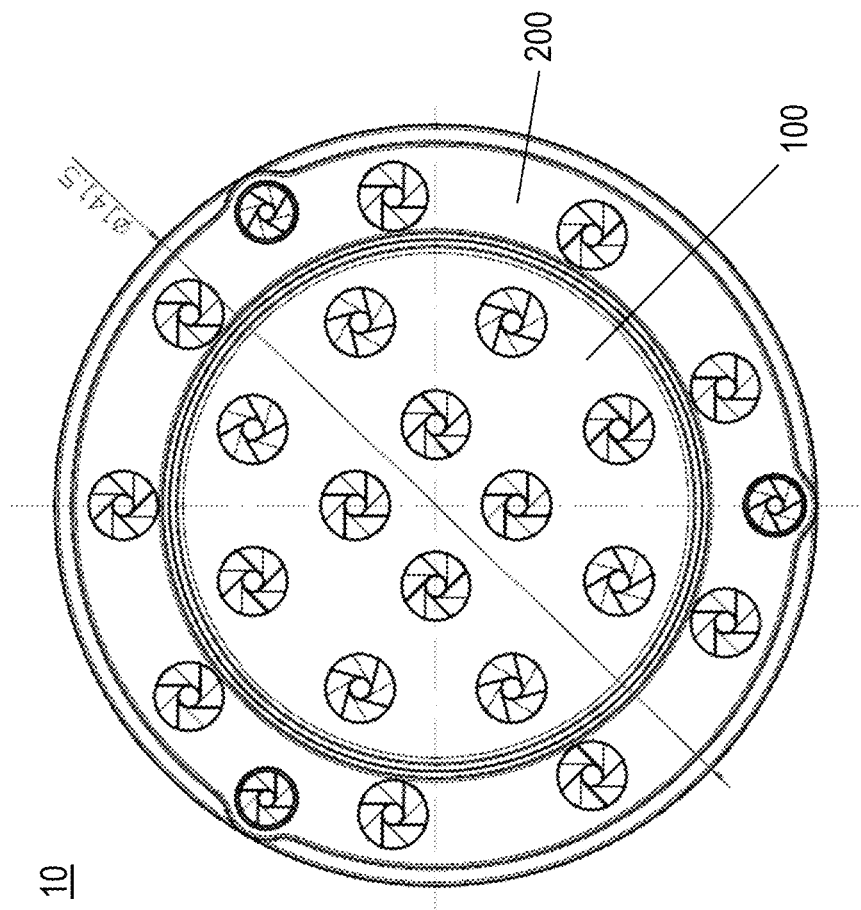
FIG. 13 is a top plan view of an illustrative round combination lamp, according to various embodiments of the present invention.
Figure 14:
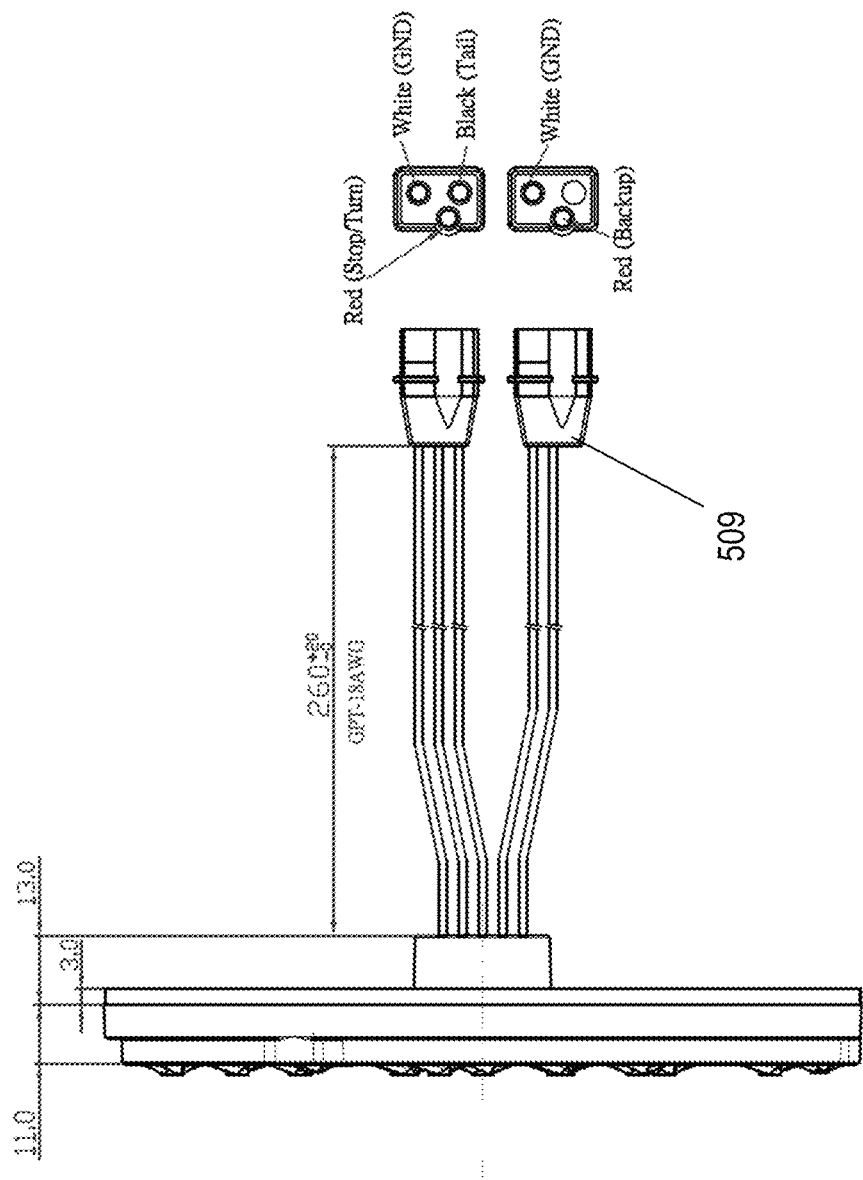
FIG. 14 is a side elevational view of the combination lamp of FIG. 13.
Figure 15:
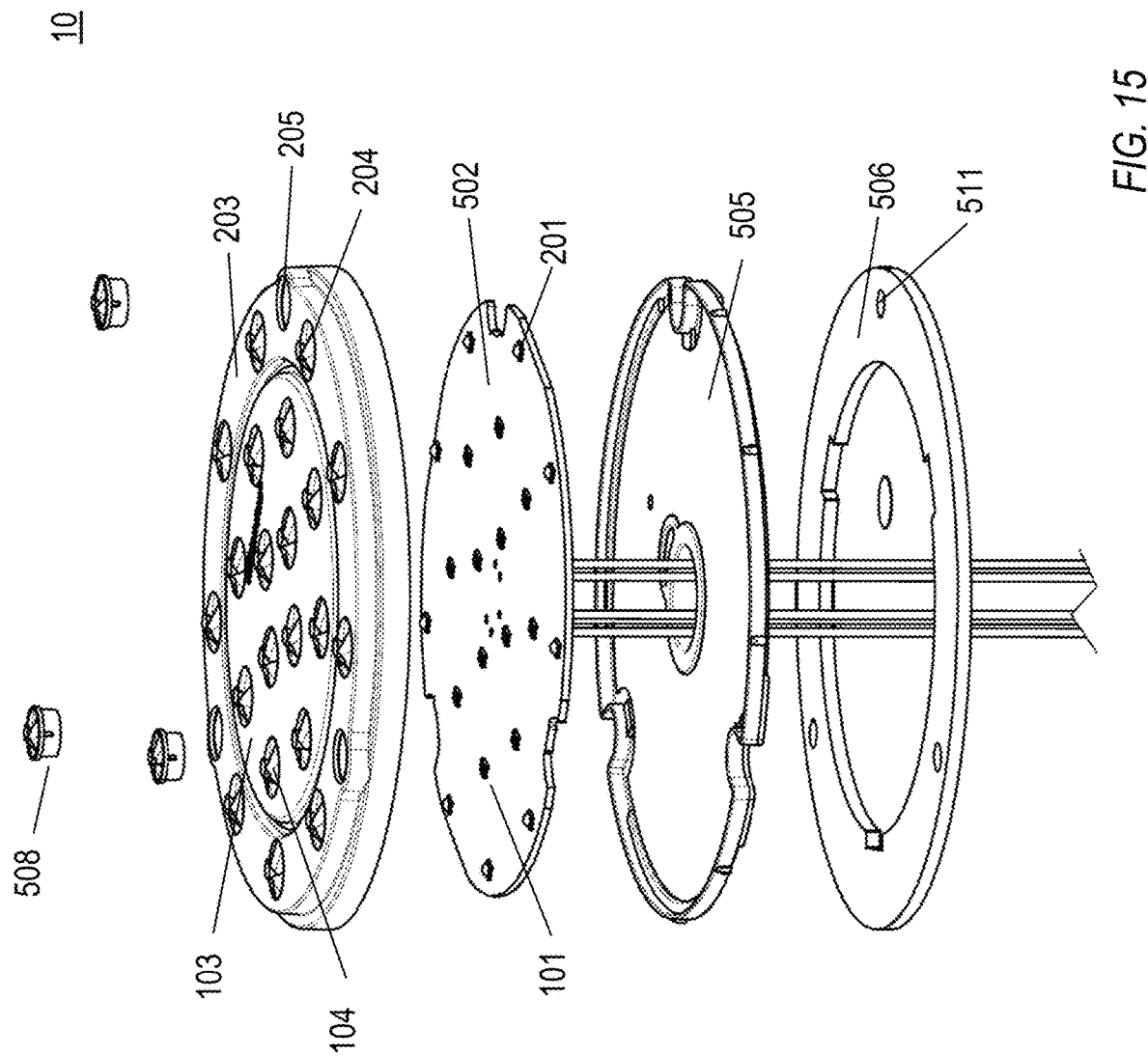
FIG. 15 is an exploded view of the combination lamp of FIG. 13.

In various other embodiments of the present invention, a combination lamp 10, 30 may be provided that utilizes different colors for different functions in the flange. With reference to FIGS. 11 and 12, for example, in various embodiments, a combination lamp 10, 30 may be provided which incorporates an emergency warning lamp 800, 900 into the flange. FIG. 11 shows an exploded view of an illustrative round combination lamp 10 with multiple functions, and FIG. 12 shows a top plan view of an illustrative oval combination lamp 30 with multiple functions. The combination lamp of FIG. 11 is similar to the combination lamp shown in FIGS. 1-4, and the combination lamp of FIG. 12 is similar to the combination lamp shown in FIGS. 5-8; however, a combination lamp 10, 30 as shown in FIGS. 11, 12 combines at least three different lamp components in a unitary configuration, and is configured such that a first portion of the LEDs of the flange comprise LEDs 201, 401 with one function (e.g., back-up lighting) while a second portion of the LEDs of the flange comprise LEDs 801, 901 with a separate function (and/or color) (e.g., a dedicated warning lamp function). LEDs 801, 901 may be a different color (e.g., amber) from LEDs 201, 401 (e.g., white), distinguishable through a clear lens 203, 403. The LEDs 101, 301 in the center area provide a third function (e.g., stop/tail/turn). LEDs 101, 301 may be white, covered by a colored (e.g., red) lens, or may be colored (e.g., red) LEDs covered by either a clear or colored (e.g., red) lens. The embodiments of combination lamp 10, 30 shown FIGS. 11 and 12 are illustrated with eight LEDs 801 and six LEDs 901, respectively, but different numbers and/or positions of LEDs 801, 901 on the flange can be used for the second function of the flange as a matter specific to an application or a matter of design choice. See also FIGS. 21-30 described further below.

The warning lamp 800, 900 may be initiated and energized by a separate (dedicated) set of wires connected to a dedicated switch (on/off). When the warning lamp 800, 900 is in use and the user decides to put the vehicle in back-up, brake (stop), or turn mode, a built-in circuit can automatically cut off the warning function, so that the intense illumination of the warning flashes does not negate the visibility of the lamp 200, 400 used for the back-up function and/or the lamp 100, 300 used for the stop/tail/turn function. In some embodiments, the amber (or other color) warning light is configured to flash unless the user chooses to install a switch to employ a steady illumination. In various embodiments, a separate set of wires can initiate the warning function. In some embodiments, where two or more combination lamps incorporating warning lamps are provided, an auxiliary wire can alternate between the different warning lamps. For example, when the auxiliary wire is connected, a user can sync the flashing of two or more warning lamps so that they flash simultaneously, alternately, have different patterns of flashing, etc.

In various embodiments, a combination lamp 10, 30 may be provided which has an appearance substantially as in FIGS. 11, 12, but also incorporates a work lamp into the flange, thus providing four functions (e.g., stop/turn/tail, back-up, warning lamp, and work lamp). For example, the LEDs 201, 401 of the flange used for the back-up function may be high output LEDs, which can be initiated and energized by a set of wires connected to a dedicated switch (on/off). In these embodiments, when the switch is off, LEDs 201, 401 can provide a standard back-up function as described above; and when the switch is turned on, LEDs 201, 401 can provide more intense lighting (e.g., for working on the side of the road). Warning LEDs 801, 901 have separate dedicated wiring connected to a dedicated switch as described above.

FIGS. 13-16 show top plan, side elevational, and exploded views and an electrical diagram of an illustrative combination lamp according to various embodiments of the invention. Dimensions marked are in mm. This combination lamp 10 embodiment (Maxxima M85417R) is a 5.5" round hybrid combination stop turn tail and back-up light, comprising a 4" round red stop turn tail (S/T/T) lamp 100 and 5.5" back-up (BU) flange 200 having 12 red LEDs 101 and nine white LEDs 201, respectively, mounted on support 502 (PCB) with back cover/housing 505 and neoprene gasket 506 with holes 511 attached. Lens 103 covering LEDs 101 may be colored (e.g., red) and may include projections 104 as described above. Lens 203 covering LEDs 201 may be clear and may include projections 204 as described above and holes 205 for mounting. Lens 103 and lens 203 may be secured to or integrally formed with one another. The combination lamp of FIGS. 13-16 may include mounting screws 507 (see FIG. 21) and screw caps (mounting screw covers) 508, and has a thin profile, sealed moisture proof electronics, and polycarbonate lens and housing components. Plastic screw caps/covers/inserts 508 can be pressed onto the screw holes 511 after the combination lamp 10 is installed on the vehicle, and can make the combination lamp 10 tamper resistant. In some embodiments, screw caps 508 are configured such that they cannot be removed once they are installed. In some embodiments, the combination lamp of FIGS. 13-16 may be provided as a kit, including two female PL3 connectors 509. In illustrative embodiments, the specifications for the combination lamp of FIGS. 13-16 are as follows: LEDs—21 (12 Red, 9 White); Voltage—12.8 VDC; Amp Draw—BU 0.2 A, Tail 20 mA, Stop 0.2 A; Dimensions—5.5" Diameter×0.5" Depth; Mounting—3-Hole Flange Mount (3) ³⁄₁₆" holes, Hole cutouts: 1³⁄₁₆" for cable exit; Connector—(2) PL3 Female, 10" Wire; DOT/SAE—J593, J2040, J2261.

FIGS. 17-20 show top plan, side elevational, and exploded views and an electrical diagram of another illustrative combination lamp according to various embodiments of the invention. Dimensions marked are in mm. This combination lamp 10 embodiment (Maxxima M85437R-WL) is a 5.5" round hybrid combination stop turn tail and back-up and work light, comprising a 4" round red stop turn tail (S/T/T) lamp 100 and 5.5" back-up (BU) flange 200 having 12 red LEDs 101 and nine white LEDs 201, respectively, mounted on support 502 (PCB) with back cover/housing 505 and neoprene gasket 506 with holes 511 attached, where LEDs 201 are embodied as higher output LEDs as described above. Lens 103 covering LEDs 101 may be colored (e.g., red) and may include projections 104 as described above. Lens 203 covering the higher output LEDs 201 may be clear and may include projections 204 as described above and holes 205 for mounting. Lens 103 and lens 203 may be secured to or integrally formed with one another. The combination lamp of FIGS. 17-20 may include mounting screws 507 (see FIG. 21) and screw caps (mounting screw covers) 508, and has a thin profile, sealed moisture proof electronics, and polycarbonate lens and housing components. Plastic screw caps/covers/inserts 508 can be pressed onto the screw holes 511 after the combination lamp 10 is installed on the vehicle, and can make the combination lamp 10 tamper resistant. In some embodiments, screw caps 508 are configured such that they cannot be removed once they are installed. Connector leads 510 (e.g., five blunt cut wires) may be color coded, for example, as follows: red (stop/turn), brown (tail), blue (back-up), black (ground), white (work light). In illustrative embodiments, the specifications for the combination lamp of FIGS. 17-20 are as follows: LEDs—21 (12 Red, 9 White); Voltage—12.8 VDC; Amp Draw—BU 0.2 A, Tail 20 mA, Stop 0.2 A, WL 1.0 A; Dimensions—5.5" Diameter×0.5" Depth; Mounting—3-Hole Flange Mount (3) ³⁄₁₆" holes, Hole cutouts: 1³⁄₁₆" for cable exit; Connector—5 Leads Blunt Cut 10"; DOT/SAE—J593, J2040, J2261. The combination lamp of FIGS. 17-20 incorporates a dual function flange back-up light and work light configured to provide, for example, 310 lumen back-up light/1,000 lumen work light (WL).

Figure 33:
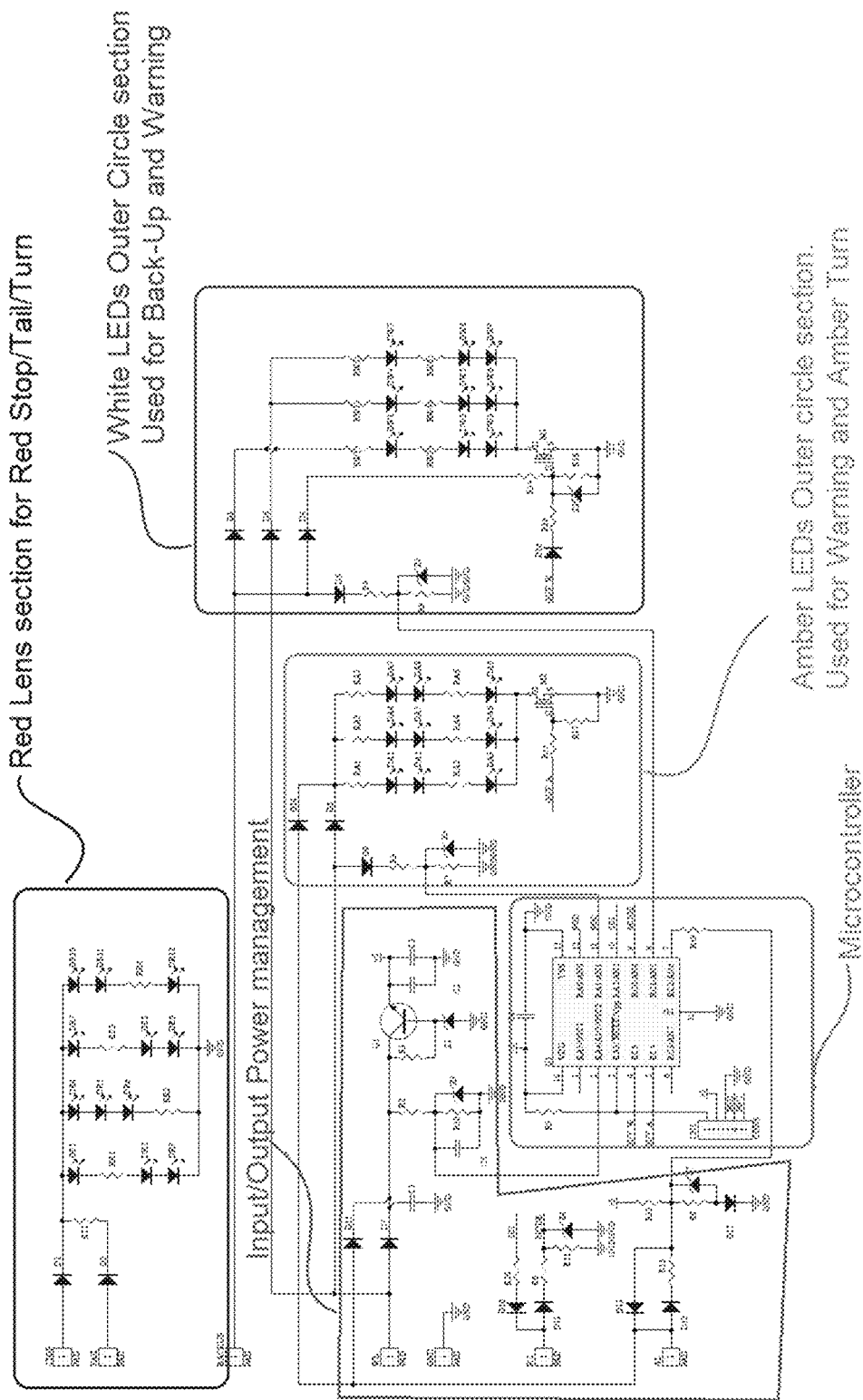
FIG. 33 shows a schematic of the electrical diagram of FIG. 26, with functional sections labeled.

FIGS. 21-26 show front perspective, top plan, bottom plan, side elevational, and exploded views and an electrical diagram of another illustrative combination lamp according to various embodiments of the invention. Dimensions marked are in mm. This combination lamp 10 embodiment (Maxxima M85427R-YCL) is a 5.5" round hybrid combination stop turn tail and back-up and flashing warning light (single color nine LED or dual color 18 LED), comprising a 4" round red stop turn tail (S/T/T) lamp 100 having 12 red LEDs 101, and a 5.5" back-up (BU) flange 200/800 having nine white LEDs 201 (back-up and warning) and nine amber LEDs 801 (warning and turn), mounted on support 502 (PCB) with back cover/housing 505 and neoprene gasket 506 with holes 511 attached. As shown, the nine white LEDs 201 and nine amber LEDs 801 alternate one-by-one around the flange; however, in other embodiments, LEDs 201, 801 may be provided in different numbers and/or arrangements/groupings around the flange (see, e.g., FIGS. 11, 12). Lens 103 covering LEDs 101 may be colored (e.g., red) and may include projections 104 as described above. Lens 203 covering LEDs 201, 801 may be clear and may have a substantially smooth exterior as shown (though alternative embodiments may include projections 204 as described above) and holes 205 for mounting. Lens 103 and lens 203 may be secured to or integrally formed with one another. The combination lamp of FIGS. 21-26 may include mounting screws 507 and screw caps (mounting screw covers) 508; has a thin profile, sealed moisture proof electronics, and polycarbonate lens and housing components; and is DOT FMVSS108/CMVSS1088 compliant. Plastic screw caps/covers/inserts 508 can be pressed onto the screw holes 511 after the combination lamp 10 is installed on the vehicle, and can make the combination lamp 10 tamper resistant. In some embodiments, screw caps 508 are configured such that they cannot be removed once they are installed. Connector leads 510 (e.g., seven blunt cut wires) may be color coded, for example, as follows: red (stop/turn), brown (tail), green (warning power), blue (back-up), black (ground), white (ALT/MODE2/turn), yellow (pattern change/SYNC). In illustrative embodiments, the specifications for the combination lamp of FIGS. 21-26 are as follows: LEDs—30 (12 Red, 9 White, 9 Amber); Voltage—12.8 VDC; Amp Draw—0.6 A Max Amp (Stop+Warn), BU 0.2 A, Tail 20 mA, Stop 0.2 A, Amber Turn 100 mA, Warn 0.4 A; Dimensions—5.5" Diameter×0.5" Depth; Mounting—3-Hole Flange Mount (3) 3/16" holes, Hole cutouts: 13/16" for cable exit; Connector—7 Leads Blunt Cut 10"; DOT/SAE—J593, J2040, J2261, J595. The combination lamp of FIGS. 21-26 provides an all-in-one S/T/T and Back-Up and Dual Color Amber White Flashing Warning (SAE J595 Class 1 Warning Device), which can flash amber only, white only, or amber/white dual color. An amber turn may be provided for trucks with a dedicated turn wire (4-wire S/T/T circuit; see FIG. 35). FIGS. 27 and 28 show the combination lamp of FIGS. 21-26 with 12 red LEDs 101 providing tail light and stop light, respectively. FIG. 29 shows the combination lamp of FIGS. 21-26 with nine white LEDs 201 providing back-up light. FIG. 30 shows the combination lamp of FIGS. 21-26 with nine amber LEDs 801 providing flashing amber warning light. In various embodiments, LEDs 101 may also provide an optional red turn; LEDs 201 may also provide an optional flashing white warning; LEDs 801 may also provide an optional amber turn. FIG. 33 shows a schematic of the electrical diagram of FIG. 26, indicating sections for input/output power management, microcontroller, red lens section for red stop/tail/turn, white LEDs in outer circle section used for back-up and warning, and amber LEDs in outer circle section used for warning and amber turn.

Figure 16:
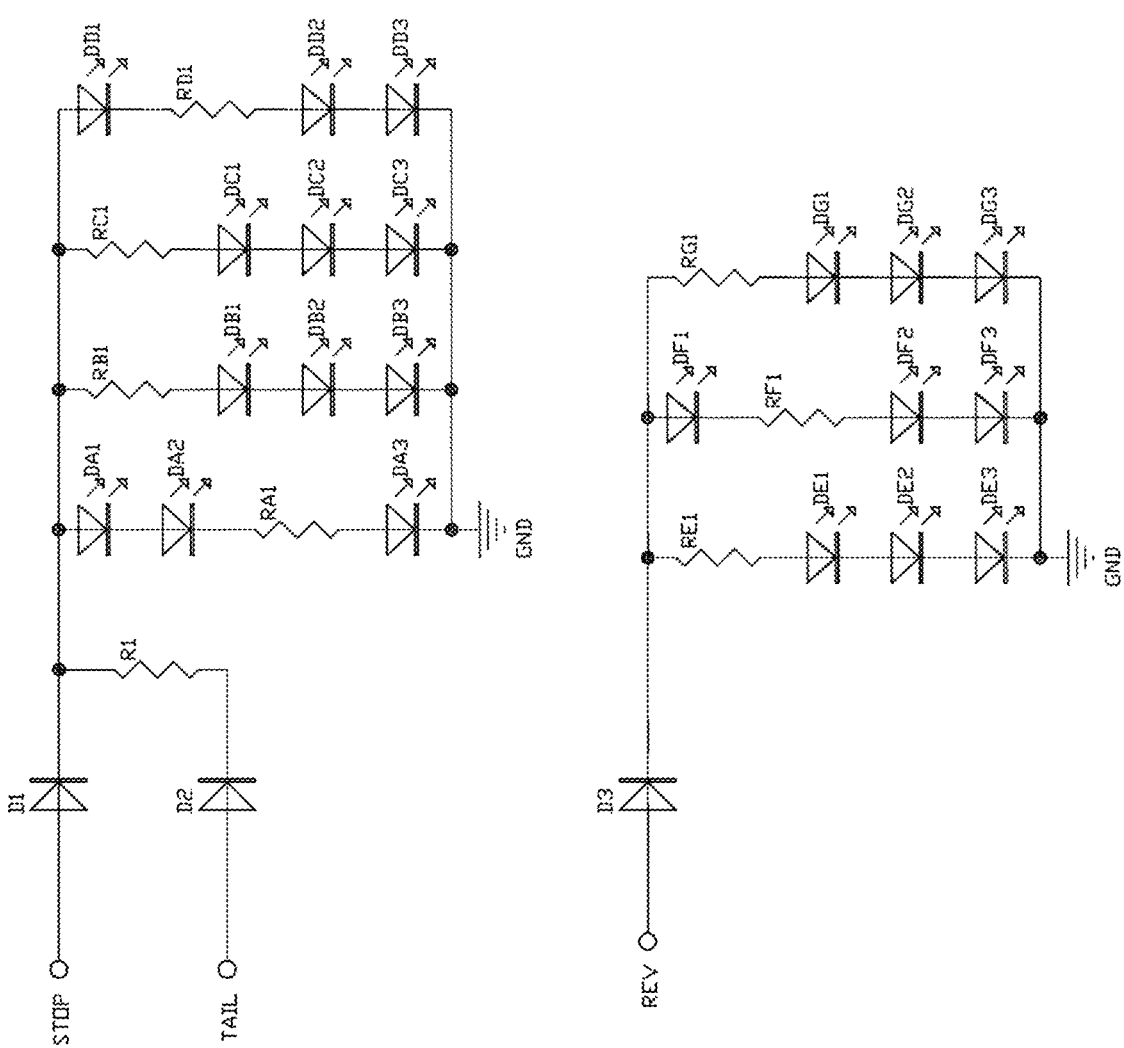
FIG. 16 is an electrical diagram of the combination lamp of FIG. 13.
Figure 17:
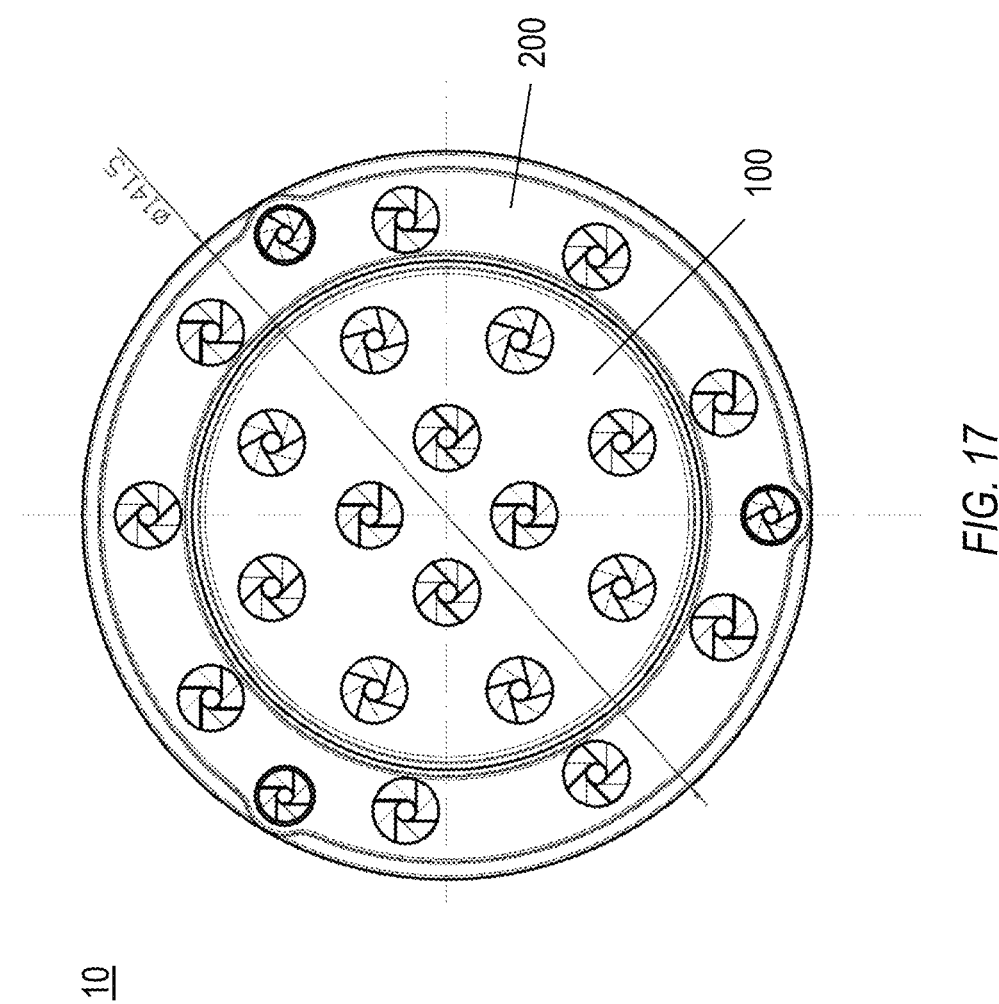
FIG. 17 is a top plan view of an illustrative round combination lamp incorporating a work lamp in the flange, according to various embodiments of the present invention.
Figure 18:
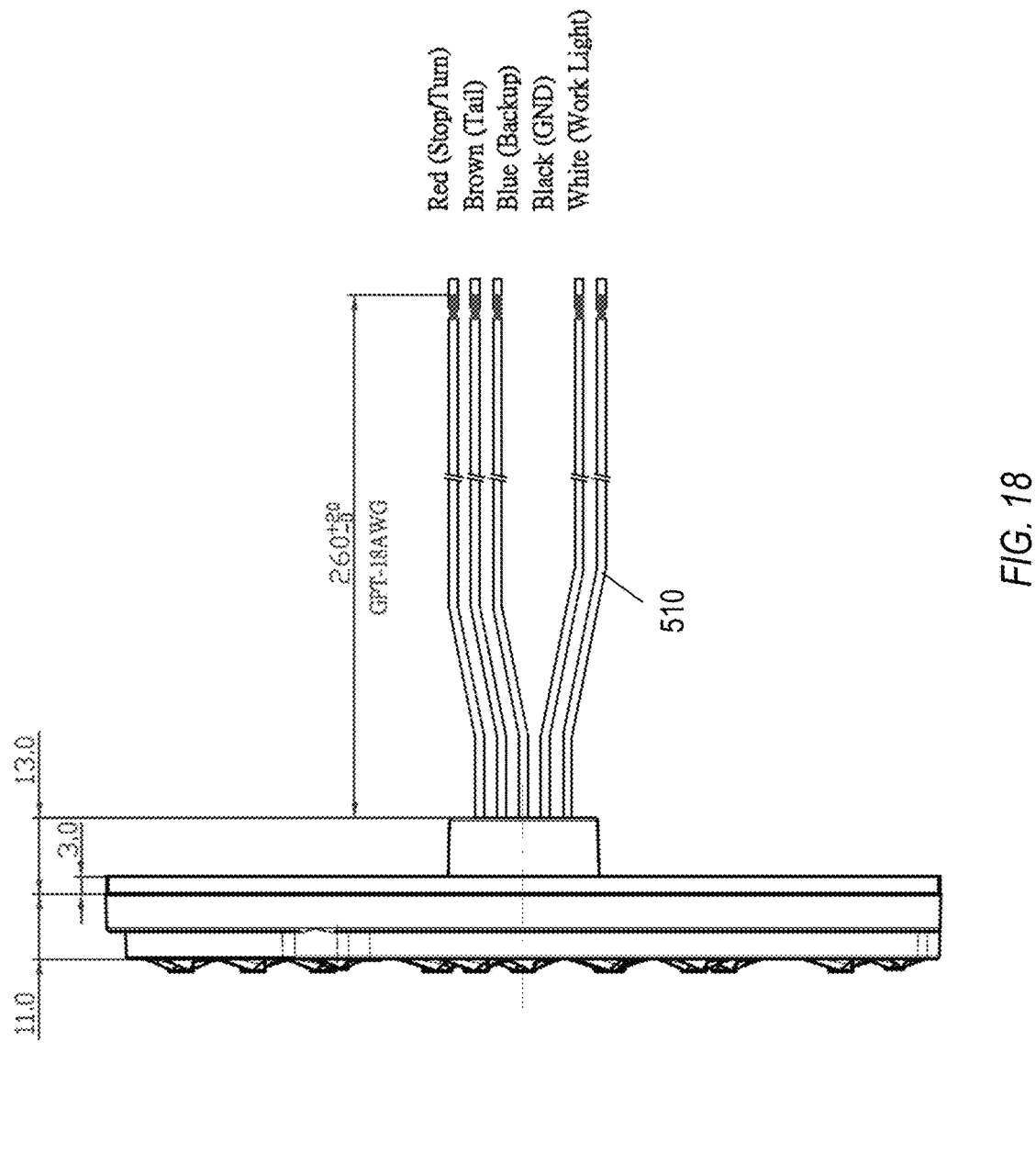
FIG. 18 is a side elevational view of the combination lamp of FIG. 17.
Figure 19:
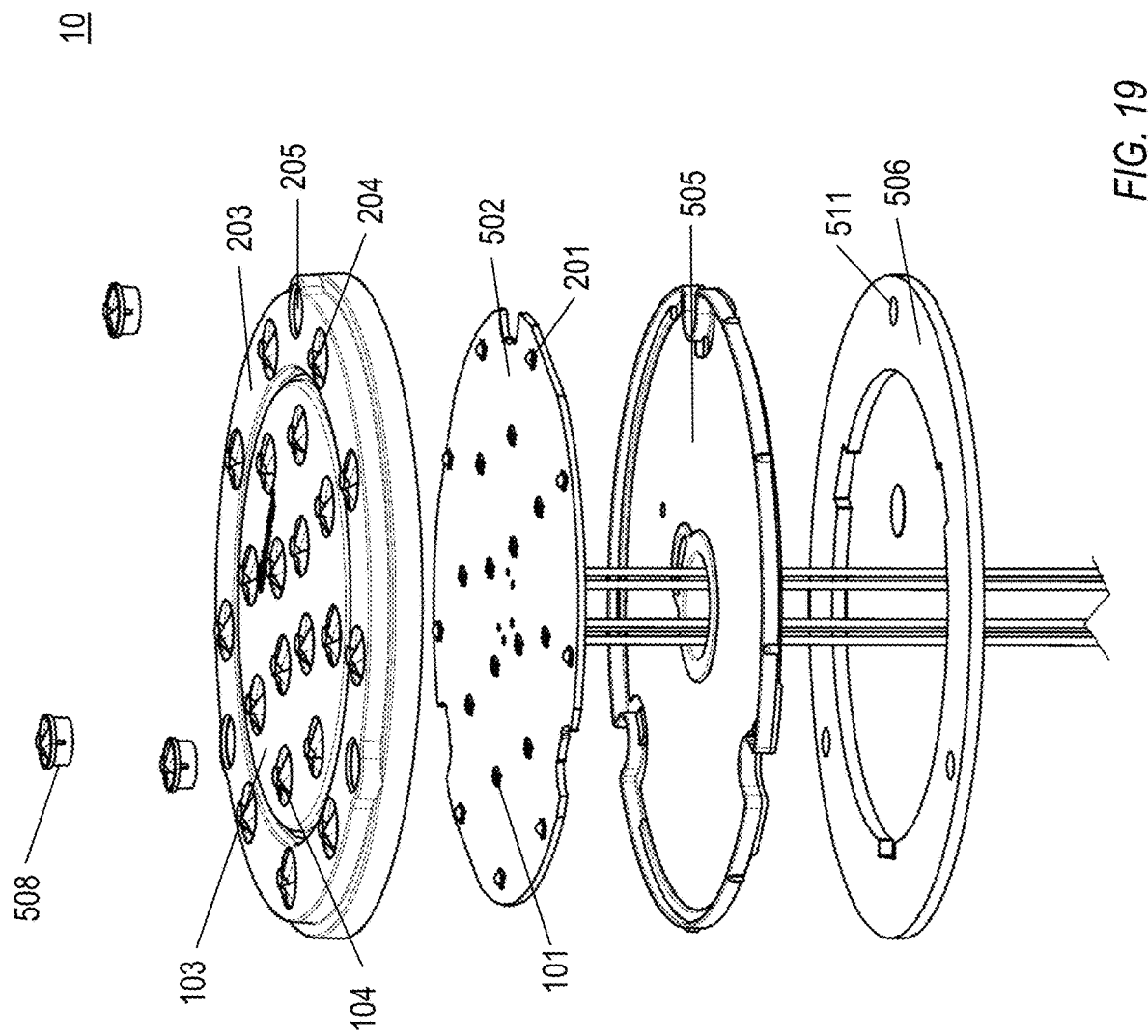
FIG. 19 is an exploded view of the combination lamp of FIG. 17.
Figure 20:
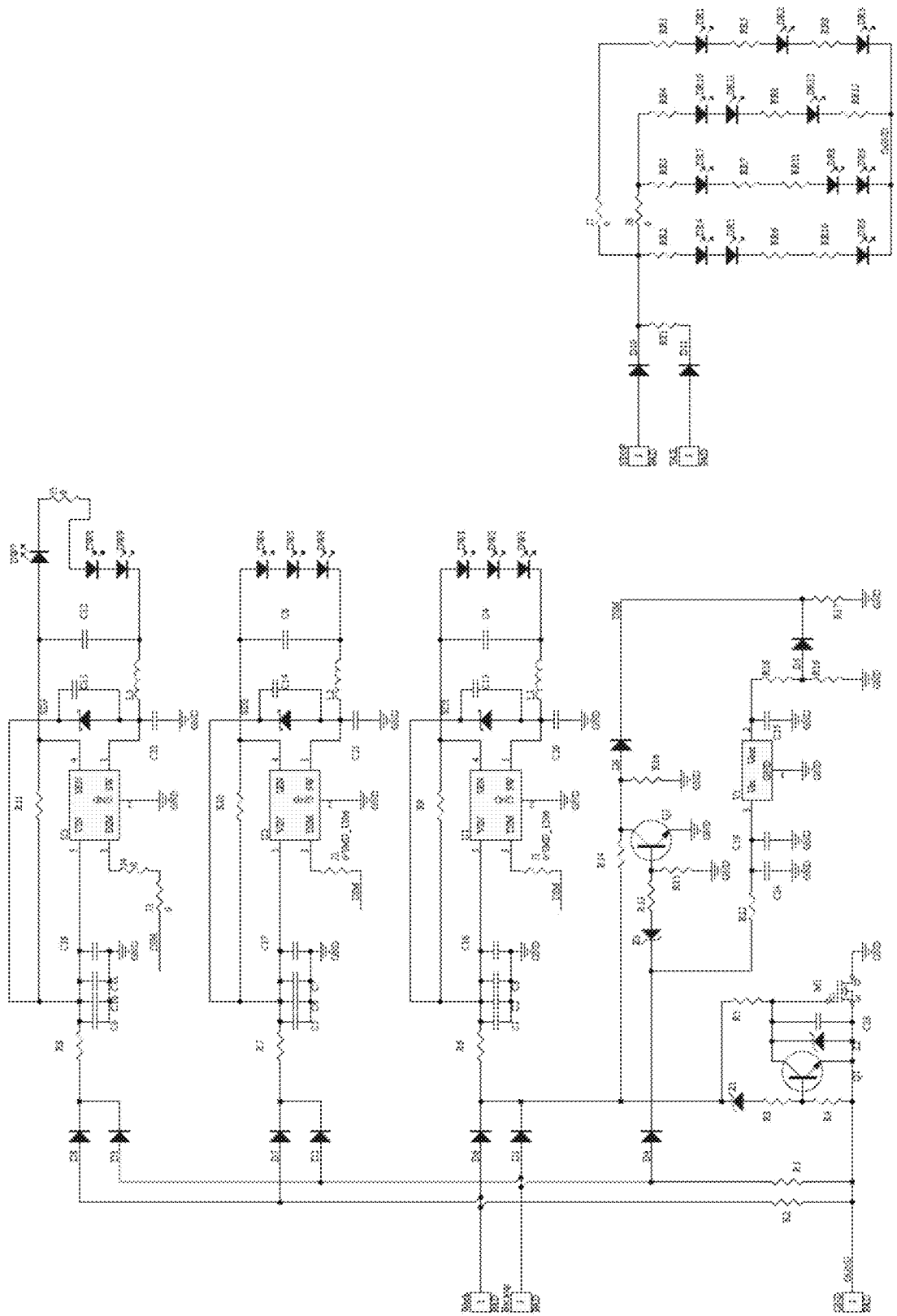
FIG. 20 is an electrical diagram of the combination lamp of FIG. 17.
Figure 21:
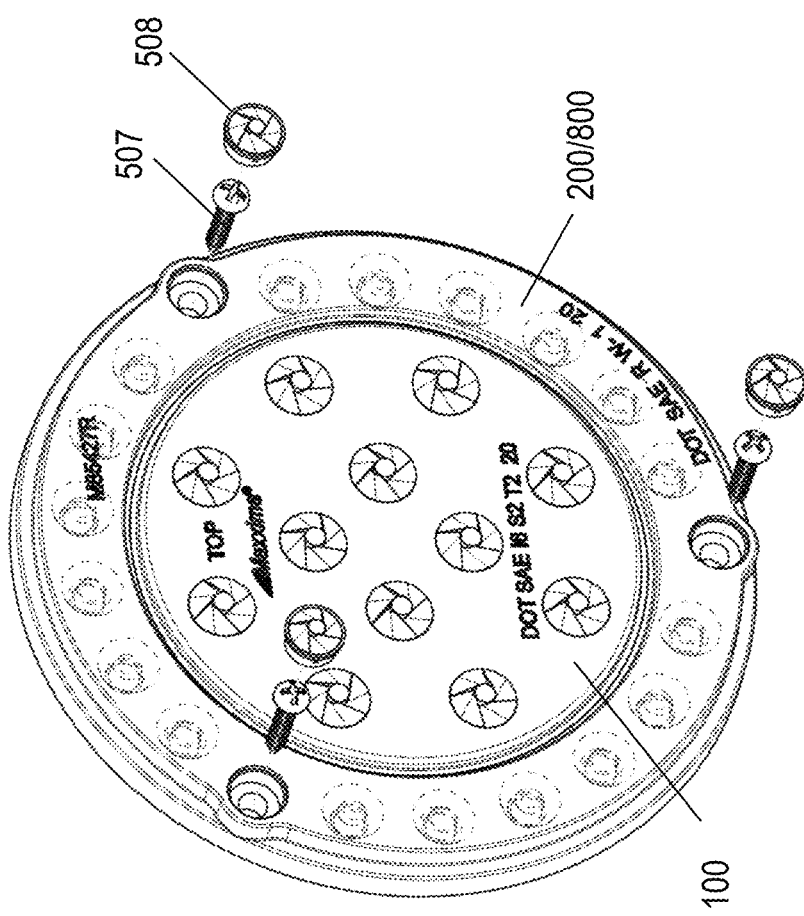
FIG. 21 is a front perspective view of an illustrative round combination lamp incorporating a warning lamp in the flange, according to various embodiments of the present invention.
Figure 22:
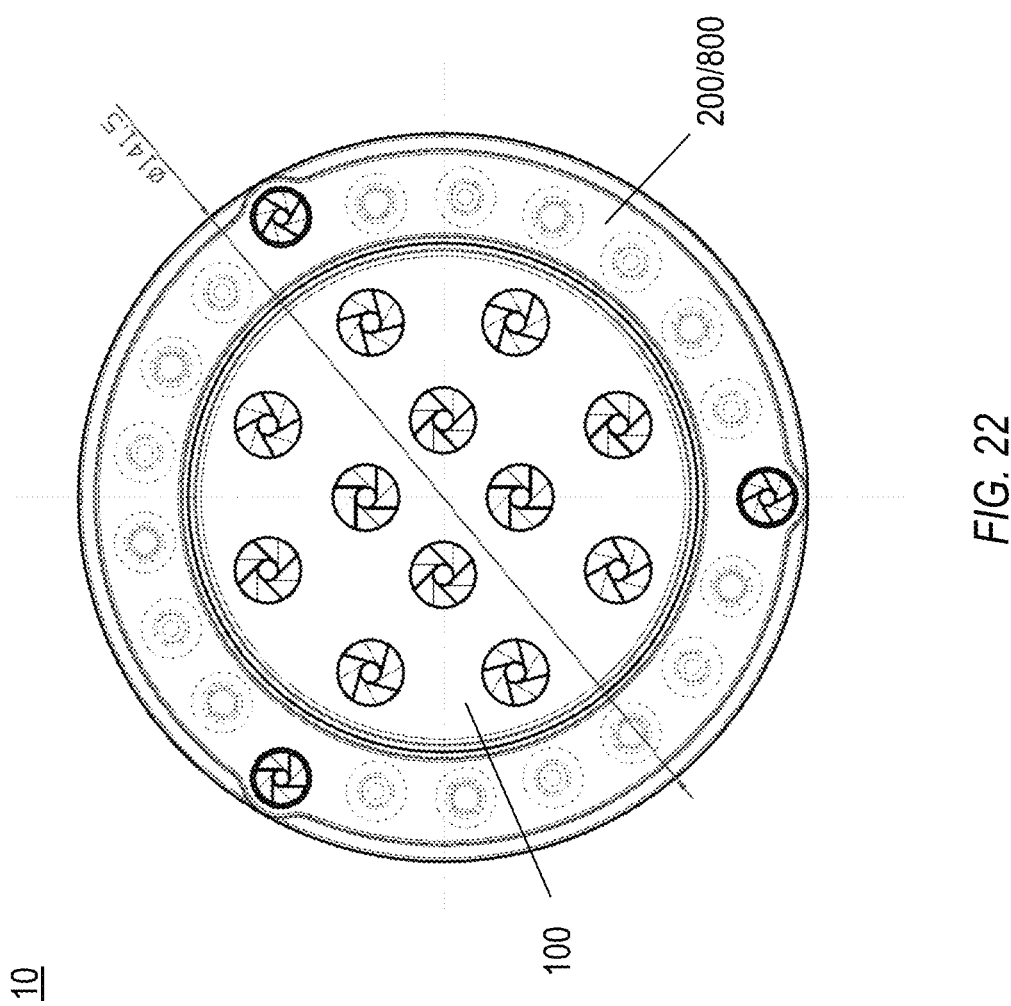
FIG. 22 is a top plan view of the combination lamp of FIG. 21.
Figure 23:
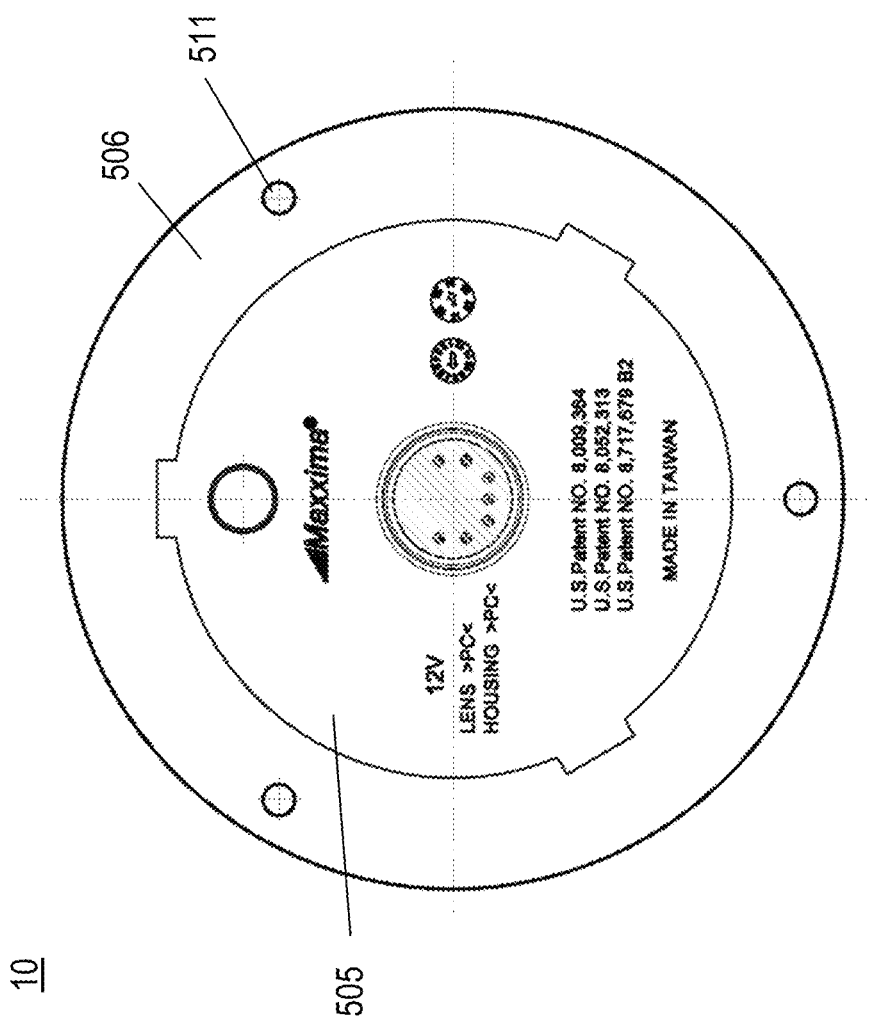
FIG. 23 is a bottom plan view of the combination lamp of FIG. 21.
Figure 24:
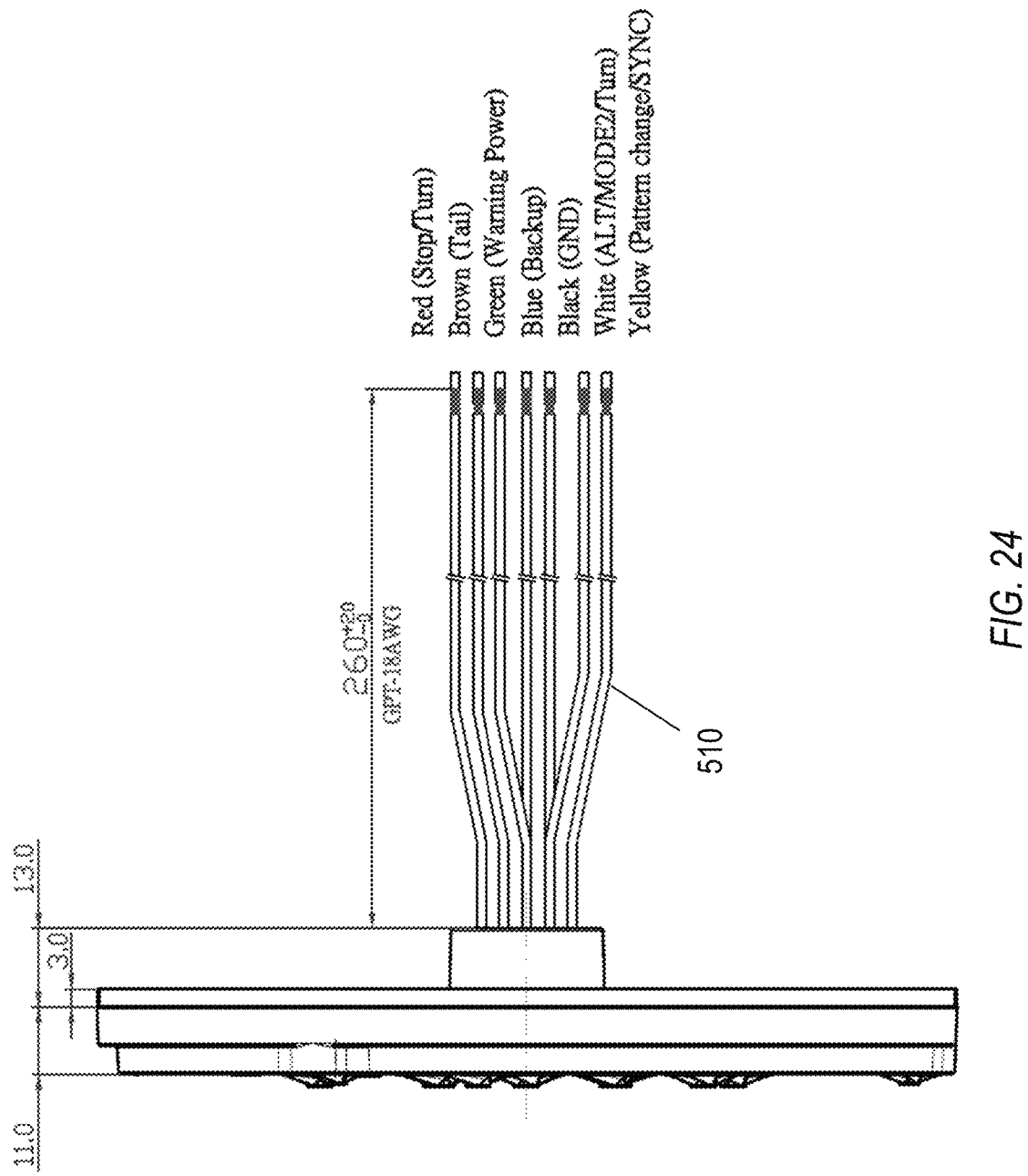
FIG. 24 is a side elevational view of the combination lamp of FIG. 21.
Figure 25:
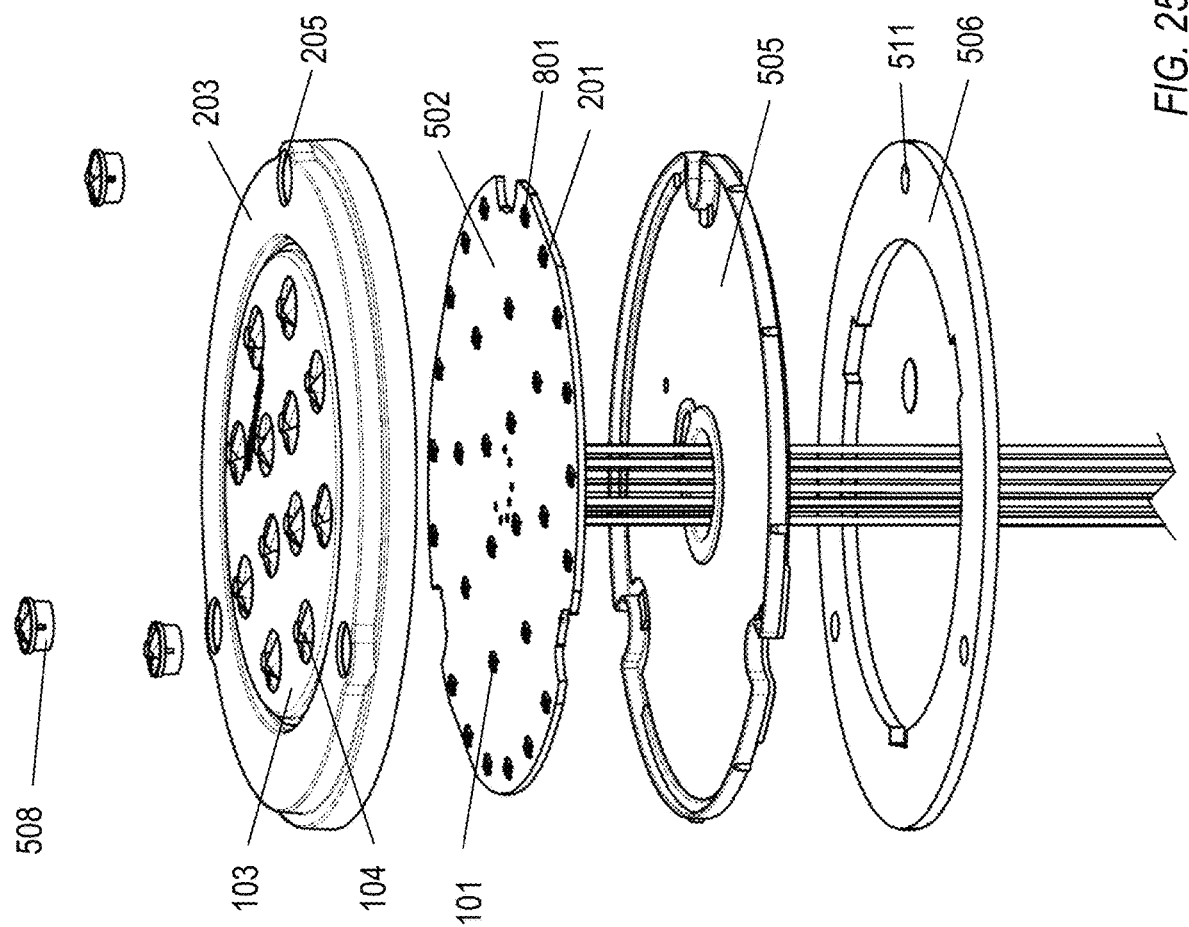
FIG. 25 is an exploded view of the combination lamp of FIG. 21.
Figure 26:
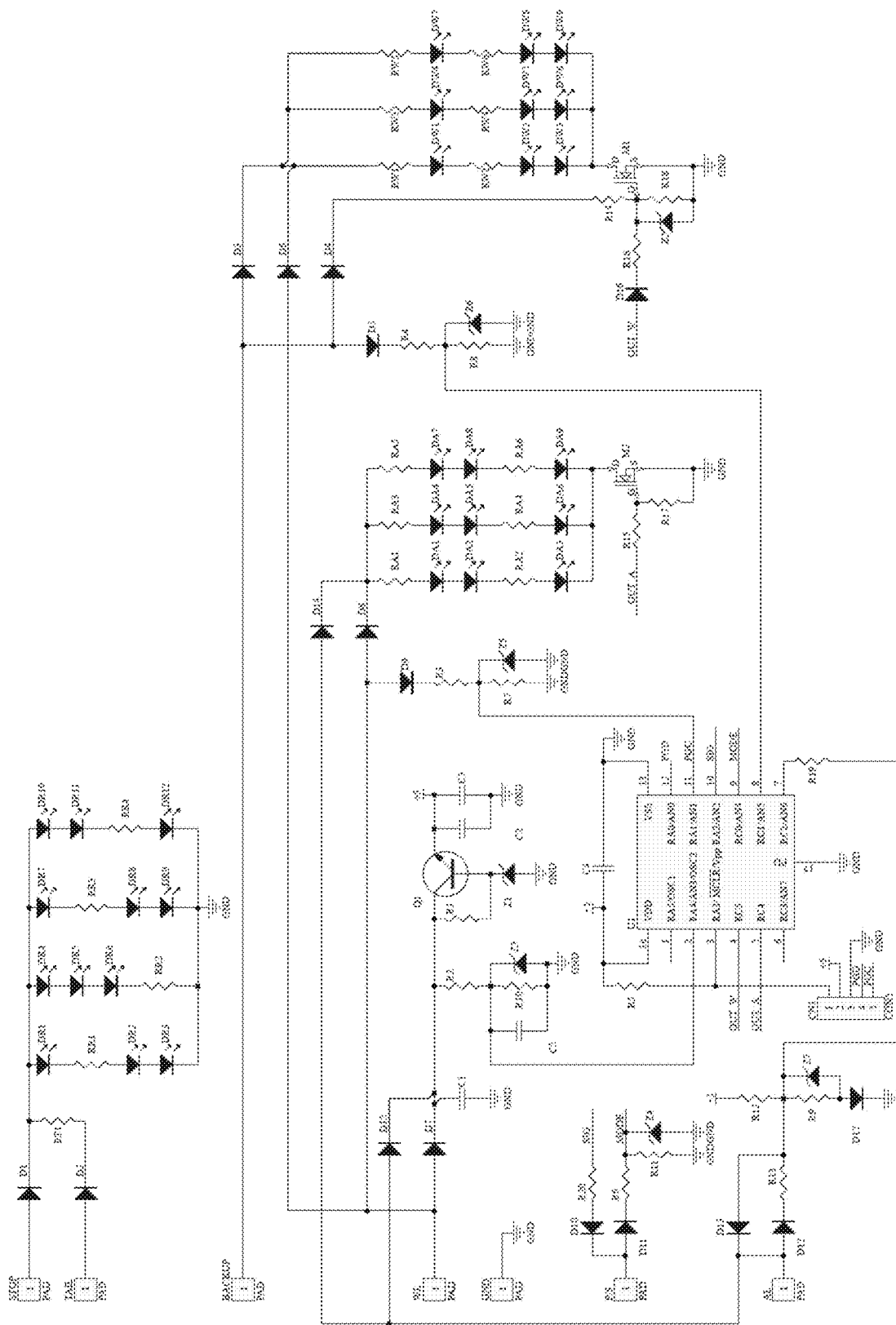
FIG. 26 is an electrical diagram of the combination lamp of FIG. 21.
Figure 31:
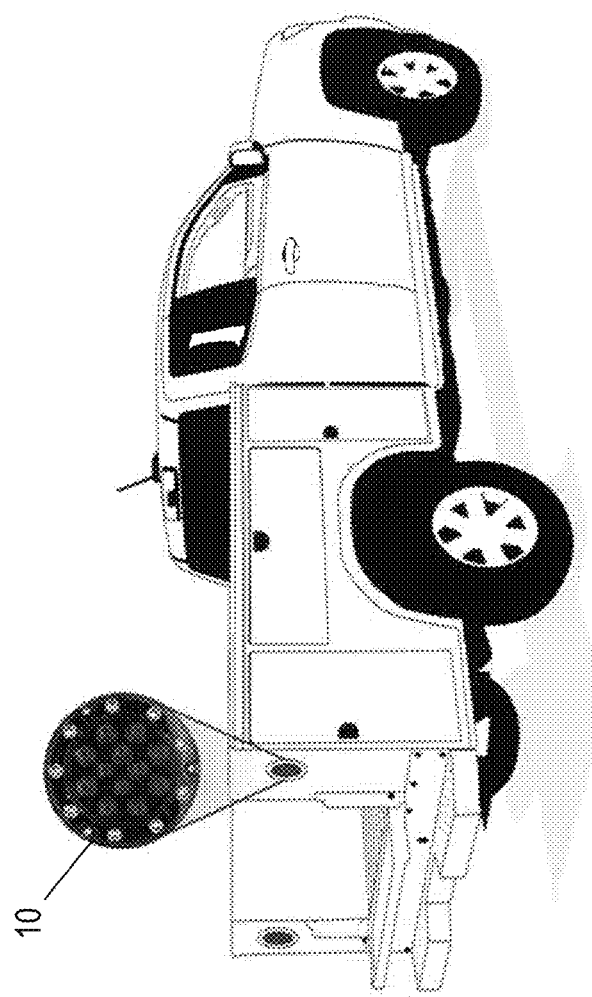
FIG. 31 shows a schematic of the combination lamp of FIG. 17 installed on the rear of a vehicle.
Figure 32:
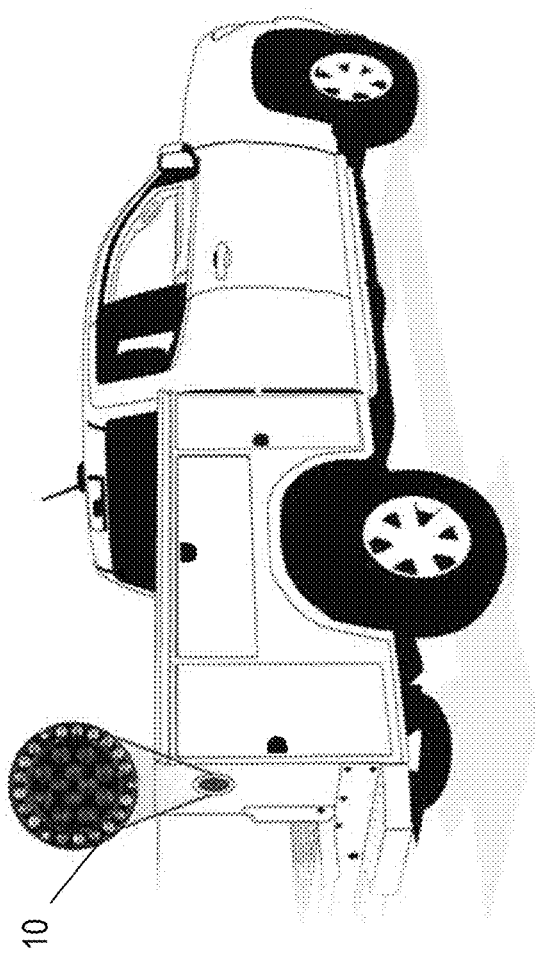
FIG. 32 shows a schematic of the combination lamp of FIG. 21 installed on the rear of a vehicle.
Figure 34:
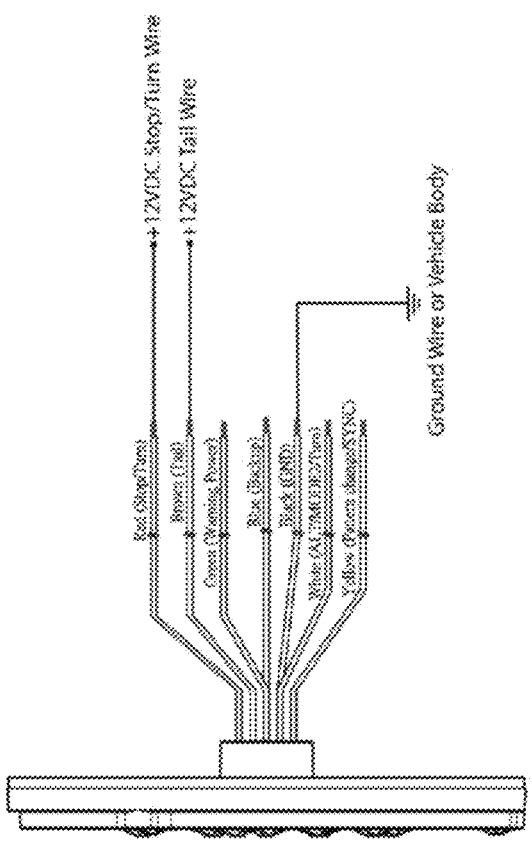
FIG. 34 shows the view of FIG. 24 with 3-Wire Stop/Turn/Tail wiring.
Figure 35:
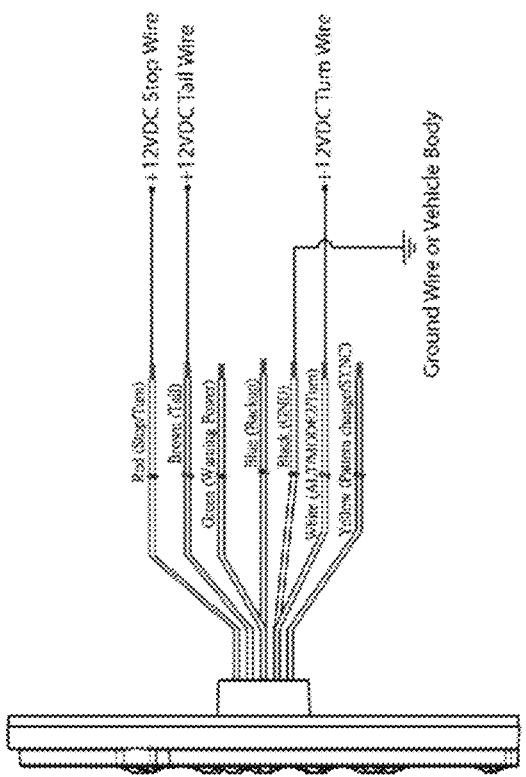
FIG. 35 shows the view of FIG. 24 with 4-Wire Stop/Turn/Tail wiring.
Figure 37:
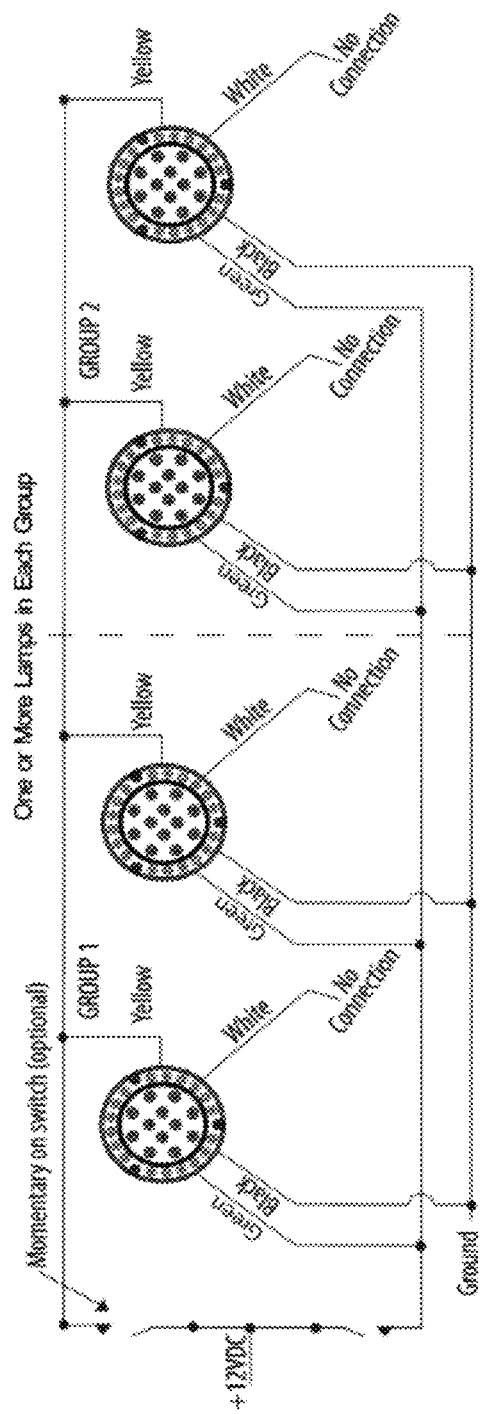
FIG. 37 shows illustrative warning wiring instructions for simultaneous flash.
Figure 38:
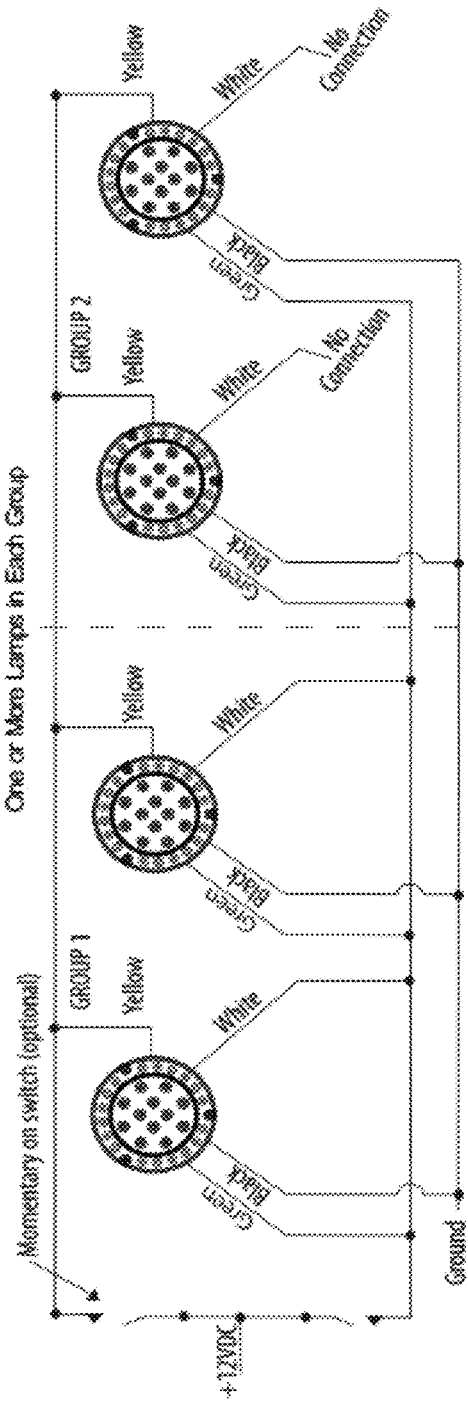
FIG. 38 shows illustrative warning wiring instructions for alternate flash.
Figure 39:
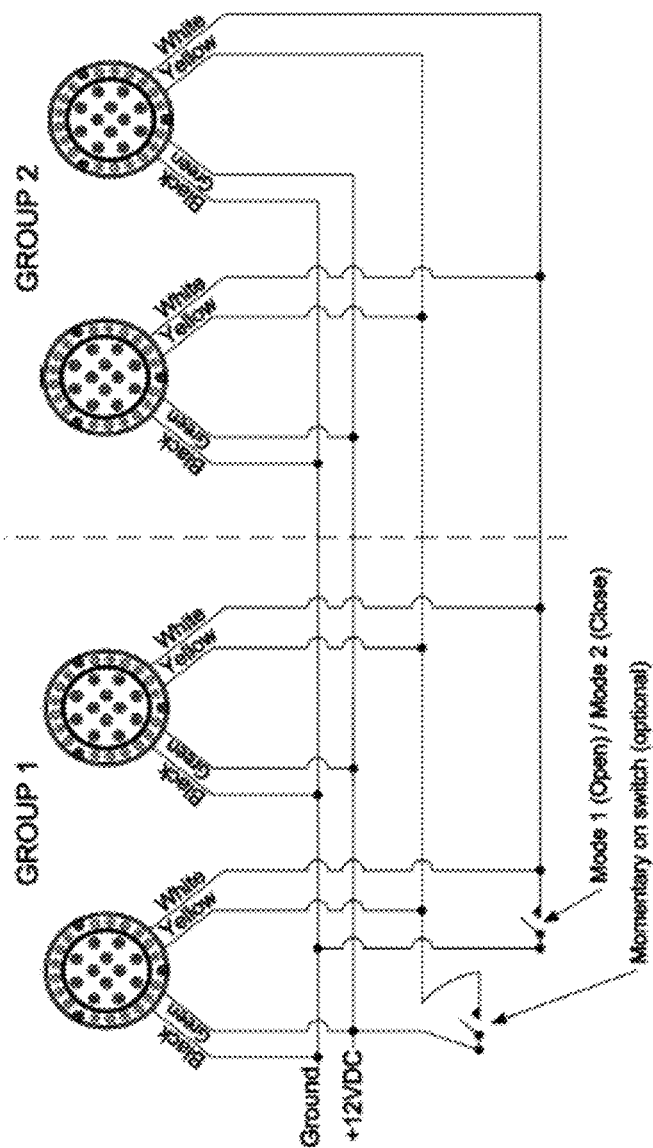
FIG. 39 shows illustrative warning wiring instructions for an optional warning Mode 2.

In various embodiments, the wiring designations for the illustrative round hybrid combination S/T/T-BU-Warning lamp 10 of FIGS. 21-16 may be, for example, as follows: black—ground (−); brown—tail (+VDC); blue—back-up (+VDC); red—stop and turn (+VDC); white—optional amber turn (+VDC), optional warning 'Mode 2' (−GND); green—flashing warning (+VDC); yellow—programming (+VDC), described in further detail below. In various embodiments, the wiring instructions may be as follows. First, determine if the vehicle has a dedicated turn signal wire or uses a common wire for both stop light and turn signal. FIG. 34 shows 3-Wire Stop/Turn/Tail wiring (red turn signal). If the vehicle uses a common wire for both stop light and turn signal, use the Red Turn Signal by connecting the Red Wire. FIG. 35 shows 4-Wire Stop/Turn/Tail wiring (amber turn signal). If the vehicle has dedicated Left and Right Turn Signal wires, independent of the Stop Light, use the optional Amber Turn Signal by connecting the White Wire. Then follow steps 1-7. Step 1—Connect Black wire to vehicle Ground (−Negative). Step 2—Connect Brown wire to vehicle Tail Light (+12V). Step 3—Connect Red wire to vehicle Stop Light (+12V). Step 4 (Optional)—Connect White wire to vehicle Left or Right Turn Signal (+12V). Step 5—Connect Blue wire to vehicle Back-up Light (+12V). Step 6—Connect Green wire "Flashing Warning Circuit" via a user-supplied switch (+12V). Step 7—Program Warning to the desired pattern with Yellow wire. While the Green wire is connected to +12V, Hold Yellow wire to +12V for 1 to 2 seconds to scroll to the next flash pattern (See Table 1). If on a Single-Color pattern, Hold Yellow wire for 3 to 5 sec to toggle to the alternate color (i.e. from Amber to White). To reset to Pattern #1, Hold Yellow wire to +12V for 7+seconds. FIG. 36 shows 28 illustrative flash patterns; however, in other embodiments, different numbers and/or types of flash patterns may be provided. In FIG. 36, an asterisk=no alternate function available, and superscript '1'=alternate between colors. Step 8— "Simultaneous Flash" or "Alternate Flash" may be selected. FIG. 37 shows warning wiring instructions for simultaneous flash. FIG. 38 shows warning wiring instructions for alternate flash (Group 1 will flash the set pattern alternatively with Group 2). To flash all lamps synchronously, join all yellow wires together. This allows the lights to communicate with each other. To use alternate or "wig-wag" flash, identify lamps in "Group 1" and "Group 2"; Connect White wires in "Group 1" to +12V. (In some embodiments, the Optional Amber Turn Signal may be disabled when the Flashing Warning light is on and/or activating the Back-up may disable the Warning light. In other embodiments, the combination lamp may be configured to enter a different Backup/Warning mode.) Step 9 (Optional)—To use the optional "Mode 2" Flashing Warning pattern, a DPDT (double-pole, double-throw) switch is needed. See the diagram in FIG. 39. To access Secondary Mode, or second flash pattern, Connect Green to +12V and White to (−) Ground. While in Mode 2, use Yellow wire (+12V) to program the desired flash pattern (step 7). Mode 1: Leave the switch open and select first pattern. Mode 2: Close the switch and select second flash pattern. Users can toggle between the two selected flash patterns by changing the switch position. A DPDT switch is needed to use an alternate mode of operation in Primary Mode (Mode 1). Connect Group 2 separately to the other pole switch (common side). The switch other two side should be +12V (alt) and Ground (Mode 2). For single color patterns, connect Yellow wires to +12 VDC (Green wire) for 3 to 5 seconds to change the color.

While there have been shown and described fundamental novel features of the invention as applied to the preferred and illustrative embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, various features and structures of the different embodiments discussed herein may be combined and interchanged. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

The invention claimed is:

1. A combination LED lamp assembly configured to be mounted on a vehicle, comprising:
    a first lamp in an inner portion of the assembly, having one or more first LEDs;
    a flange at least partially surrounding the first lamp, the flange including a second lamp having one or more second LEDs and a third lamp having one or more third LEDs; and
    a connector comprising at least seven connections, the connector including a first connection configured to connect to the vehicle ground; a second connection configured to connect to the vehicle tail light a third connection configured to connect to the vehicle stop light a fourth connection configured to connect to the vehicle turn signal; a fifth connection configured to connect to the vehicle backup light; a sixth connection configured to connect a warning circuit to the vehicle power via a switch; and a seventh connection configured to select a warning flash pattern,
    wherein the first lamp is configured to provide red tail light and stop light, and wherein the flange is configured to provide white backup light when the switch is turned off, and dual color amber white warning light flashing amber only, white only, or amber and white when the switch is turned on.

2. The assembly of claim 1, wherein the vehicle uses a common wire for both stop light and turn signal, and the third connection is connected to the vehicle stop light to provide a red turn light.

3. The assembly of claim 1, wherein the vehicle has a dedicated turn signal wire, and the fourth connection is connected to the vehicle turn signal to provide an amber turn light.

4. The assembly of claim 1, wherein the flange includes a plurality of holes and the assembly is configured to be mounted on the vehicle via the holes.

5. The assembly of claim 1, wherein the seventh connection is configured to scroll to the next pattern in a plurality of flash patterns when the switch is turned on and the seventh connection is connected to the vehicle power for a first time period.

6. The assembly of claim 5, wherein the plurality of flash patterns comprise dual color flash patterns and single color flash patterns.

7. The assembly of claim 6, wherein when a single color flash pattern is selected, the seventh connection is further configured to toggle to an alternate color when connected to the vehicle power for a second time period.

8. The assembly of claim 7, wherein the seventh connection is further configured to reset to a predetermined first flash pattern when connected to the vehicle power for a third time period.

9. The assembly of claim 1, wherein the assembly further comprises mounting screws and mounting screw covers, the mounting screw covers configured to be tamper-resistant.

10. The assembly of claim 1, wherein the assembly further comprises a neoprene gasket attached to a back side of the assembly.

11. The assembly of claim 1, wherein the assembly has a diameter of about 5.5 inches and a depth of about 0.5 inches.

12. The assembly of claim 1, wherein the assembly is in a first group of one or more lamps and a second assembly according to claim 1 is in a second group of one or more lamps, the first group and the second group configured to flash a selected pattern simultaneously when the seventh connections of both groups are joined together and the fourth connections of both groups have no connection.

13. The assembly of claim 1, wherein the assembly is in a first group of one or more lamps and a second assembly according to claim 1 is in a second group of one or more lamps, the first group and the second group configured to flash a selected pattern alternately when the seventh connections of both groups are joined together, the fourth connections of the first group are connected to the vehicle power, and the fourth connections of the second group have no connection.

14. A combination LED lamp assembly configured to be mounted on a vehicle, comprising:
    a first lamp in an inner portion of the assembly, having one or more first LEDs and configured to provide stop, turn, and tail lamp functions; and
    a flange at least partially surrounding the first lamp, the flange including a second lamp having one or more second LEDs and configured to provide back-up lamp and work lamp functions,
    wherein the one or more second LEDs are high output LEDs energized by a set of connections connected to a switch, configured to provide back-up light at a first luminosity when the switch is turned off, and work light at a second, higher luminosity when the switch is turned on.

15. The assembly of claim 14, wherein the second lamp is configured to provide a light output of about 310 lm when operated as a back-up lamp and about 1,000 lm when operated as a work lamp.

16. The assembly of claim 14, wherein the flange includes a plurality of holes and the assembly is configured to be mounted on the vehicle via the holes.

17. The assembly of claim 14, wherein the one or more second LEDs are mounted to an aluminum PCB.

18. The assembly of claim 14, wherein the assembly further comprises mounting screws and mounting screw covers, the mounting screw covers configured to be tamper-resistant.

19. The assembly of claim 14, wherein the assembly further comprises a neoprene gasket attached to a back side of the assembly.

20. The assembly of claim 14, wherein the assembly has a diameter of about 5.5 inches and a depth of about 0.5 inches.

* * * * *